US011180069B2

(12) United States Patent
Jarvis et al.

(10) Patent No.: US 11,180,069 B2
(45) Date of Patent: Nov. 23, 2021

(54) AUTOMATED LOADING OF DELIVERY VEHICLES USING AUTOMATED GUIDED VEHICLES

(71) Applicant: Staples, Inc., Framingham, MA (US)

(72) Inventors: Daniel Jarvis, Windermere, FL (US); Paolo Gerli Amador, Westborough, MA (US); Michael Bhaskaran, Sherborn, MA (US); Amit Kalra, Acton, MA (US)

(73) Assignee: Staples, Inc., Framingham, MA (US)

( * ) Notice: Subject to any disclaimer, the term of this patent is extended or adjusted under 35 U.S.C. 154(b) by 88 days.

(21) Appl. No.: 16/237,645

(22) Filed: Dec. 31, 2018

(65) Prior Publication Data

US 2020/0207250 A1 Jul. 2, 2020

(51) Int. Cl.
*B60P 3/00* (2006.01)
*G05B 15/02* (2006.01)
*G05D 1/02* (2020.01)
*G06Q 50/28* (2012.01)
*G01C 21/34* (2006.01)
(Continued)

(52) U.S. Cl.
CPC ............. *B60P 3/007* (2013.01); *B60P 1/00* (2013.01); *G01C 21/343* (2013.01); *G01C 21/3623* (2013.01); *G05B 15/02* (2013.01); *G05D 1/0212* (2013.01); *G06Q 50/28* (2013.01)

(58) Field of Classification Search
CPC .... B60P 3/00; B60P 3/007; B60P 1/00; G01C 21/34; G01C 21/3623; G05B 15/00; G05D 1/0212; G06Q 50/28
See application file for complete search history.

(56) References Cited

U.S. PATENT DOCUMENTS

| 3,450,276 A | 6/1969 | Ferrari |
| 3,474,877 A | 10/1969 | Wesener |
| 3,628,624 A | 12/1971 | Wesener |

(Continued)

FOREIGN PATENT DOCUMENTS

| CA | 1196712 A | 11/1985 |
| CA | 1210367 A | 8/1986 |

(Continued)

OTHER PUBLICATIONS

US 7,460,017 B2, 12/2008, Roeder et al. (withdrawn)

(Continued)

*Primary Examiner* — Ig T An
(74) *Attorney, Agent, or Firm* — VLP Law Group LLP; Michel Bohn

(57) ABSTRACT

A system and method for automated loading of delivery vehicles using automated guided vehicles is described. In an example implementation, a loading coordination engine may determine a delivery destination of a first item based on item data associated with the first item, assign the first item to a location in a delivery vehicle, and generate a task list including an instruction to an automated guided vehicle to position the first item in the delivery vehicle based on the assigned location in the delivery vehicle. In some instances, the automated guided vehicle may navigate to a loading area to retrieve the first item from the loading area, navigate to a point proximate to the assigned location in the delivery vehicle, and place the first item at the assigned location based on the task list.

20 Claims, 13 Drawing Sheets

(51) Int. Cl.
  *B60P 1/00* (2006.01)
  *G01C 21/36* (2006.01)

(56) References Cited

U.S. PATENT DOCUMENTS

| | | |
|---|---|---|
| 3,970,840 A | 7/1976 | De Bruine |
| 4,010,409 A | 3/1977 | Waites |
| 4,215,759 A | 8/1980 | Diaz |
| 4,258,813 A | 3/1981 | Rubel |
| 4,278,142 A | 7/1981 | Kono |
| 4,465,155 A | 8/1984 | Collins |
| 4,496,274 A | 1/1985 | Pipes |
| 4,524,314 A | 6/1985 | Walker |
| 4,530,056 A | 7/1985 | MacKinnon et al. |
| 4,556,940 A | 12/1985 | Katoo et al. |
| 4,562,635 A | 1/1986 | Carter |
| 4,566,032 A | 1/1986 | Hirooka et al. |
| 4,593,238 A | 6/1986 | Yamamoto |
| 4,593,239 A | 6/1986 | Yamamoto |
| 4,652,803 A | 3/1987 | Kamejima et al. |
| 4,653,002 A | 3/1987 | Barry |
| 4,657,463 A | 4/1987 | Pipes |
| 4,678,390 A | 7/1987 | Bonneton et al. |
| 4,700,302 A | 10/1987 | Arakawa et al. |
| 4,711,316 A | 12/1987 | Katou et al. |
| 4,714,399 A | 12/1987 | Olson |
| 4,716,530 A | 12/1987 | Ogawa et al. |
| 4,727,492 A | 2/1988 | Reeve et al. |
| 4,742,283 A | 5/1988 | Bolger et al. |
| 4,751,983 A | 6/1988 | Leskovec et al. |
| 4,764,078 A | 8/1988 | Neri |
| 4,772,832 A | 9/1988 | Okazaki et al. |
| 4,773,018 A | 9/1988 | Lundstrom |
| 4,777,601 A | 10/1988 | Boegli |
| 4,780,817 A | 10/1988 | Lofgren |
| 4,790,402 A | 12/1988 | Field et al. |
| 4,802,096 A | 1/1989 | Hainsworth et al. |
| 4,811,227 A | 3/1989 | Wikstrom |
| 4,811,229 A | 3/1989 | Wilson |
| 4,817,000 A | 3/1989 | Eberhardt |
| 4,846,297 A | 7/1989 | Field et al. |
| 4,847,769 A | 7/1989 | Reeve |
| 4,847,773 A | 7/1989 | van Helsdingen et al. |
| 4,847,774 A | 7/1989 | Tomikawa et al. |
| 4,852,677 A | 8/1989 | Okazaki |
| 4,857,912 A | 8/1989 | Everett, Jr. et al. |
| 4,858,132 A | 8/1989 | Holmquist |
| 4,862,047 A | 8/1989 | Suzuki et al. |
| 4,863,335 A | 9/1989 | Herigstad et al. |
| 4,875,172 A | 10/1989 | Kanayama |
| 4,890,233 A | 12/1989 | Ando et al. |
| 4,894,908 A | 1/1990 | Haba et al. |
| 4,918,607 A | 4/1990 | Wible |
| 4,924,153 A | 5/1990 | Toru et al. |
| 4,926,544 A | 5/1990 | Koyanagi et al. |
| 4,935,871 A | 6/1990 | Grohsmeyer |
| 4,939,650 A | 7/1990 | Nishikawa |
| 4,939,651 A | 7/1990 | Onishi |
| 4,942,531 A | 7/1990 | Hainsworth et al. |
| 4,947,324 A | 8/1990 | Kamimura et al. |
| 4,950,118 A | 8/1990 | Mueller et al. |
| 4,954,962 A | 9/1990 | Evans, Jr. et al. |
| 4,982,329 A | 1/1991 | Tabata et al. |
| 4,990,841 A | 2/1991 | Elder |
| 4,993,507 A | 2/1991 | Ohkura |
| 4,994,970 A | 2/1991 | Noji et al. |
| 4,996,468 A | 2/1991 | Field et al. |
| 5,000,279 A | 3/1991 | Kondo et al. |
| 5,002,145 A | 3/1991 | Wakaumi et al. |
| 5,005,128 A | 4/1991 | Robins et al. |
| 5,006,988 A | 4/1991 | Borenstein et al. |
| 5,020,620 A | 6/1991 | Field |
| 5,023,790 A | 6/1991 | Luke, Jr. |
| 5,040,116 A | 8/1991 | Evans, Jr. et al. |
| 5,052,882 A | 10/1991 | Blau et al. |
| 5,053,969 A | 10/1991 | Booth |
| 5,073,749 A | 12/1991 | Kanayama |
| 5,109,940 A | 5/1992 | Yardley |
| 5,111,401 A | 5/1992 | Everett, Jr. et al. |
| 5,125,783 A | 6/1992 | Kawasoe et al. |
| 5,134,353 A | 7/1992 | Kita et al. |
| 5,138,560 A | 8/1992 | Lanfer et al. |
| 5,154,249 A | 10/1992 | Yardley |
| 5,164,648 A | 11/1992 | Kita et al. |
| 5,170,351 A | 12/1992 | Nemoto et al. |
| 5,170,352 A | 12/1992 | McTamaney et al. |
| 5,179,329 A | 1/1993 | Nishikawa et al. |
| 5,187,664 A | 2/1993 | Yardley et al. |
| 5,191,528 A | 3/1993 | Yardley et al. |
| 5,192,903 A | 3/1993 | Kita et al. |
| 5,199,524 A | 4/1993 | Ivancic |
| 5,202,832 A | 4/1993 | Lisy |
| 5,211,523 A | 5/1993 | Andrada Galan et al. |
| 5,216,605 A | 6/1993 | Yardley et al. |
| 5,239,249 A | 8/1993 | Ono |
| 5,249,157 A | 9/1993 | Taylor |
| 5,281,901 A | 1/1994 | Yardley et al. |
| 5,305,217 A | 4/1994 | Nakamura et al. |
| 5,341,130 A | 8/1994 | Yardley et al. |
| 5,387,853 A | 2/1995 | Ono |
| 5,488,277 A | 1/1996 | Nishikawa et al. |
| 5,510,984 A | 4/1996 | Markin et al. |
| 5,525,884 A | 6/1996 | Sugiura et al. |
| 5,545,960 A | 8/1996 | Ishikawa |
| 5,548,512 A | 8/1996 | Quraishi |
| 5,564,890 A | 10/1996 | Knudsen, Jr. |
| 5,568,030 A | 10/1996 | Nishikawa et al. |
| 5,650,703 A | 7/1997 | Yardley et al. |
| 5,669,748 A | 9/1997 | Knudsen, Jr. |
| 5,875,408 A | 2/1999 | Bendett et al. |
| 5,911,767 A | 6/1999 | Garibotto et al. |
| 5,923,270 A | 7/1999 | Sampo et al. |
| 5,961,559 A | 10/1999 | Shimbara et al. |
| 6,049,745 A | 4/2000 | Douglas et al. |
| 6,058,339 A | 5/2000 | Takiguchi et al. |
| 6,092,010 A | 7/2000 | Alofs et al. |
| 6,246,930 B1 | 6/2001 | Hori |
| 6,256,560 B1 | 7/2001 | Kim et al. |
| 6,345,217 B1 | 2/2002 | Zeitler et al. |
| 6,370,452 B1 | 4/2002 | Pfister |
| 6,377,888 B1 | 4/2002 | Olch |
| 6,422,152 B1 | 7/2002 | Rowe |
| 6,459,966 B2 | 10/2002 | Nakano et al. |
| 6,477,463 B2 | 11/2002 | Hamilton |
| 6,493,614 B1 | 12/2002 | Jung |
| 6,602,037 B2 | 8/2003 | Winkler |
| 6,615,108 B1 | 9/2003 | Peless et al. |
| 6,629,028 B2 | 9/2003 | Paromtchik et al. |
| 6,654,647 B1 | 11/2003 | Kal |
| 6,721,638 B2 | 4/2004 | Zeitler |
| 6,748,292 B2 | 6/2004 | Mountz |
| 6,772,062 B2 | 8/2004 | Lasky et al. |
| 6,882,910 B2 | 4/2005 | Jeong |
| 6,885,912 B2 | 4/2005 | Peless et al. |
| 6,895,301 B2 | 5/2005 | Mountz |
| 6,904,343 B2 | 6/2005 | Kang |
| 6,950,722 B2 | 9/2005 | Mountz |
| 6,971,464 B2 | 12/2005 | Marino et al. |
| 7,050,891 B2 | 5/2006 | Chen |
| 7,110,855 B2 | 9/2006 | Leishman |
| 7,155,309 B2 | 12/2006 | Peless et al. |
| 7,305,287 B2 | 12/2007 | Park |
| 7,333,631 B2 | 2/2008 | Roh et al. |
| 7,349,759 B2 | 3/2008 | Peless et al. |
| 7,402,018 B2 | 7/2008 | Mountz et al. |
| 7,403,120 B2 | 7/2008 | Duron et al. |
| 7,437,226 B2 | 10/2008 | Roh et al. |
| 7,460,016 B2 | 12/2008 | Sorenson, Jr. et al. |
| 7,505,849 B2 | 3/2009 | Saarikivi |
| 7,548,166 B2 | 6/2009 | Roeder et al. |
| 7,557,714 B2 | 7/2009 | Roeder et al. |
| 7,609,175 B2 | 10/2009 | Porte et al. |
| 7,613,617 B2 | 11/2009 | Williams et al. |
| 7,616,127 B2 | 11/2009 | Sorenson, Jr. et al. |

(56) References Cited

U.S. PATENT DOCUMENTS

| | | |
|---|---|---|
| 7,634,332 B2 | 12/2009 | Williams et al. |
| 7,639,142 B2 | 12/2009 | Roeder et al. |
| 7,648,329 B2 | 1/2010 | Chilson et al. |
| 7,656,296 B2 | 2/2010 | Runyon et al. |
| 7,681,796 B2 | 3/2010 | Cato et al. |
| 7,689,001 B2 | 3/2010 | Kim et al. |
| 7,693,757 B2 | 4/2010 | Zimmerman |
| 7,765,027 B2 | 7/2010 | Hong et al. |
| 7,826,919 B2 | 11/2010 | DAndrea et al. |
| 7,835,821 B2 | 11/2010 | Roh et al. |
| 7,840,328 B2 | 11/2010 | Baginski et al. |
| 7,845,560 B2 | 12/2010 | Emanuel et al. |
| 7,850,413 B2 | 12/2010 | Fontana |
| 7,873,469 B2 | 1/2011 | DAndrea et al. |
| 7,890,228 B2 | 2/2011 | Redmann, Jr. et al. |
| 7,894,932 B2 | 2/2011 | Mountz et al. |
| 7,894,933 B2 | 2/2011 | Mountz et al. |
| 7,894,939 B2 | 2/2011 | Zini et al. |
| 7,894,951 B2 | 2/2011 | Norris et al. |
| 7,912,574 B2 | 3/2011 | Wurman et al. |
| 7,912,633 B1 | 3/2011 | Dietsch et al. |
| 7,920,962 B2 | 4/2011 | DAndrea et al. |
| 7,925,514 B2 | 4/2011 | Williams et al. |
| 7,953,551 B2 | 5/2011 | Park et al. |
| 7,980,808 B2 | 7/2011 | Chilson et al. |
| 7,991,521 B2 | 8/2011 | Stewart |
| 7,996,109 B2 | 8/2011 | Zini et al. |
| 8,010,230 B2 | 8/2011 | Zini et al. |
| 8,020,657 B2 | 9/2011 | Allard et al. |
| 8,031,086 B2 | 10/2011 | Thacher et al. |
| 8,068,978 B2 | 11/2011 | DAndrea et al. |
| 8,072,309 B2 | 12/2011 | Kraimer et al. |
| 8,075,243 B2 | 12/2011 | Chilson et al. |
| 8,146,702 B2 | 4/2012 | Schendel et al. |
| 8,160,728 B2 | 4/2012 | Curtis |
| 8,170,711 B2 | 5/2012 | DAndrea et al. |
| 8,192,137 B2 | 6/2012 | Ross et al. |
| 8,193,903 B2 | 6/2012 | Kraimer et al. |
| 8,196,835 B2 | 6/2012 | Emanuel et al. |
| 8,200,423 B2 | 6/2012 | Dietsch et al. |
| 8,204,624 B2 | 6/2012 | Zini et al. |
| 8,210,791 B2 | 7/2012 | Chilson et al. |
| 8,220,710 B2 | 7/2012 | Hoffman et al. |
| 8,229,619 B2 | 7/2012 | Roh et al. |
| 8,239,291 B2 | 8/2012 | Hoffman et al. |
| 8,265,873 B2 | 9/2012 | DAndrea et al. |
| 8,269,643 B2 | 9/2012 | Chou |
| 8,271,132 B2 | 9/2012 | Nielsen et al. |
| 8,280,546 B2 | 10/2012 | DAndrea et al. |
| 8,280,547 B2 | 10/2012 | DAndrea et al. |
| 8,311,902 B2 | 11/2012 | Mountz et al. |
| 8,369,981 B2 | 2/2013 | Dunsker et al. |
| 8,381,982 B2 | 2/2013 | Kunzig et al. |
| 8,406,949 B2 | 3/2013 | Kondo |
| 8,412,400 B2 | 4/2013 | DAndrea et al. |
| 8,417,444 B2 | 4/2013 | Smid et al. |
| 8,418,919 B1 | 4/2013 | Beyda |
| 8,433,442 B2 | 4/2013 | Friedman et al. |
| 8,433,469 B2 | 4/2013 | Harvey et al. |
| 8,444,369 B2 | 5/2013 | Watt et al. |
| 8,452,464 B2 | 5/2013 | Castaneda et al. |
| 8,457,978 B2 | 6/2013 | Williams et al. |
| 8,473,140 B2 | 6/2013 | Norris et al. |
| 8,483,869 B2 | 7/2013 | Wurman et al. |
| 8,498,734 B2 | 7/2013 | Dunsker et al. |
| 8,515,612 B2 | 8/2013 | Tanaka et al. |
| 8,538,692 B2 | 9/2013 | Wurman et al. |
| 8,571,781 B2 | 10/2013 | Bernstein et al. |
| 8,577,551 B2 | 11/2013 | Siefring et al. |
| 8,587,455 B2 | 11/2013 | Porte et al. |
| 8,594,834 B1 | 11/2013 | Clark et al. |
| 8,606,392 B2 | 12/2013 | Wurman et al. |
| 8,626,332 B2 | 1/2014 | Dunsker et al. |
| 8,626,335 B2 | 1/2014 | Wurman et al. |
| 8,639,382 B1 | 1/2014 | Clark et al. |
| 8,649,899 B2 | 2/2014 | Wurman et al. |
| 8,653,945 B2 | 2/2014 | Baek et al. |
| 8,670,892 B2 | 3/2014 | Yang |
| 8,676,426 B1 | 3/2014 | Murphy |
| 8,700,502 B2 | 4/2014 | Mountz et al. |
| 8,718,814 B1 | 5/2014 | Clark et al. |
| 8,725,286 B2 | 5/2014 | DAndrea et al. |
| 8,725,317 B2 | 5/2014 | Elston et al. |
| 8,725,362 B2 | 5/2014 | Elston et al. |
| 8,725,363 B2 | 5/2014 | Elston et al. |
| 8,731,777 B2 | 5/2014 | Castaneda et al. |
| 8,751,063 B2 | 6/2014 | Bernstein et al. |
| 8,751,147 B2 | 6/2014 | Colwell |
| 8,755,936 B2 | 6/2014 | Friedman et al. |
| 8,760,276 B2 | 6/2014 | Yamazato |
| 8,761,989 B1 | 6/2014 | Murphy |
| 8,788,121 B2 | 7/2014 | Klinger |
| 8,798,784 B1 | 8/2014 | Clark et al. |
| 8,798,786 B2 | 8/2014 | Wurman et al. |
| 8,798,840 B2 | 8/2014 | Fong et al. |
| 8,805,573 B2 | 8/2014 | Brunner et al. |
| 8,805,574 B2 | 8/2014 | Stevens et al. |
| 8,825,257 B2 | 9/2014 | Ozaki et al. |
| 8,831,984 B2 | 9/2014 | Hoffman et al. |
| 8,862,397 B2 | 10/2014 | Tsujimoto et al. |
| 8,874,300 B2 | 10/2014 | Allard et al. |
| 8,874,360 B2 | 10/2014 | Klinger et al. |
| 8,880,416 B2 | 11/2014 | Williams et al. |
| 8,886,385 B2 | 11/2014 | Takahashi et al. |
| 8,892,240 B1 | 11/2014 | Vliet et al. |
| 8,892,241 B2 | 11/2014 | Weiss |
| 8,909,368 B2 | 12/2014 | DAndrea et al. |
| 8,930,133 B2 | 1/2015 | Wurman et al. |
| 8,948,956 B2 | 2/2015 | Takahashi et al. |
| 8,954,188 B2 | 2/2015 | Sullivan et al. |
| 8,965,561 B2 | 2/2015 | Jacobus et al. |
| 8,965,562 B1 | 2/2015 | Wurman et al. |
| 8,965,578 B2 | 2/2015 | Versteeg et al. |
| 8,970,363 B2 | 3/2015 | Kraimer et al. |
| 8,972,045 B1 | 3/2015 | Mountz et al. |
| 8,983,647 B1 | 3/2015 | Dwarakanath et al. |
| 8,988,285 B2 | 3/2015 | Smid et al. |
| 8,989,918 B2 | 3/2015 | Sturm |
| 9,002,506 B1 | 4/2015 | Agarwal et al. |
| 9,002,581 B2 | 4/2015 | Castaneda et al. |
| 9,008,827 B1 | 4/2015 | Dwarakanath et al. |
| 9,008,828 B2 | 4/2015 | Worsley |
| 9,008,829 B2 | 4/2015 | Worsley |
| 9,008,830 B2 | 4/2015 | Worsley |
| 9,009,072 B2 | 4/2015 | Mountz et al. |
| 9,014,902 B1 | 4/2015 | Murphy |
| 9,020,679 B2 | 4/2015 | Zini et al. |
| 9,026,301 B2 | 5/2015 | Zini et al. |
| 9,043,016 B2 | 5/2015 | Filippov et al. |
| 9,046,893 B2 | 6/2015 | Douglas et al. |
| 9,052,714 B2 | 6/2015 | Creasey et al. |
| 9,056,719 B2 | 6/2015 | Tanahashi |
| 9,067,317 B1 | 6/2015 | Wurman et al. |
| 9,073,736 B1 | 7/2015 | Hussain et al. |
| 9,082,293 B2 | 7/2015 | Wellman et al. |
| 9,087,314 B2 | 7/2015 | Hoffman et al. |
| 9,090,214 B2 | 7/2015 | Bernstein et al. |
| 9,090,400 B2 | 7/2015 | Wurman et al. |
| 9,098,080 B2 | 8/2015 | Norris et al. |
| 9,110,464 B2 | 8/2015 | Holland et al. |
| 9,111,251 B1 | 8/2015 | Brazeau |
| 9,114,838 B2 | 8/2015 | Bernstein et al. |
| 9,120,621 B1 | 9/2015 | Curlander et al. |
| 9,120,622 B1 | 9/2015 | Elazary et al. |
| 9,122,276 B2 | 9/2015 | Kraimer et al. |
| 9,129,250 B1 | 9/2015 | Sestini et al. |
| 9,134,734 B2 | 9/2015 | Lipkowski et al. |
| 9,146,559 B2 | 9/2015 | Kuss et al. |
| 9,147,173 B2 | 9/2015 | Jones et al. |
| 9,150,263 B2 | 10/2015 | Bernstein et al. |
| 9,152,149 B1 | 10/2015 | Palamarchuk et al. |
| 9,185,998 B1 | 11/2015 | Dwarakanath et al. |
| 9,188,982 B2 | 11/2015 | Thomson |
| 9,193,404 B2 | 11/2015 | Bernstein et al. |

(56) References Cited

U.S. PATENT DOCUMENTS

| | | |
|---|---|---|
| 9,202,382 B2 | 12/2015 | Klinger et al. |
| 9,206,023 B2 | 12/2015 | Wong et al. |
| 9,207,673 B2 | 12/2015 | Pulskamp et al. |
| 9,207,676 B2 | 12/2015 | Wu et al. |
| 9,211,920 B1 | 12/2015 | Bernstein et al. |
| 9,213,934 B1 | 12/2015 | Versteeg et al. |
| 9,216,745 B2 | 12/2015 | Beardsley et al. |
| 9,218,003 B2 | 12/2015 | Fong et al. |
| 9,218,316 B2 | 12/2015 | Bernstein et al. |
| 9,242,799 B1 | 1/2016 | OBrien et al. |
| 9,244,463 B2 | 1/2016 | Pfaff et al. |
| 9,248,973 B1 | 2/2016 | Brazeau |
| 9,260,244 B1 | 2/2016 | Cohn |
| 9,266,236 B2 | 2/2016 | Clark et al. |
| 9,268,334 B1 | 2/2016 | Vavrick |
| 9,274,526 B2 | 3/2016 | Murai et al. |
| 9,280,153 B1 | 3/2016 | Palamarchuk et al. |
| 9,280,157 B2 | 3/2016 | Wurman et al. |
| 9,290,220 B2 | 3/2016 | Bernstein et al. |
| 9,304,001 B2 | 4/2016 | Park et al. |
| 9,310,802 B1 | 4/2016 | Elkins et al. |
| 9,317,034 B2 | 4/2016 | Hoffman et al. |
| 9,329,078 B1 | 5/2016 | Mundhenke et al. |
| 9,329,599 B1 | 5/2016 | Sun et al. |
| 9,330,373 B2 | 5/2016 | Mountz et al. |
| 9,341,720 B2 | 5/2016 | Garin et al. |
| 9,342,811 B2 | 5/2016 | Mountz et al. |
| 9,346,619 B1 | 5/2016 | OBrien et al. |
| 9,346,620 B2 | 5/2016 | Brunner et al. |
| 9,352,745 B1 | 5/2016 | Theobald |
| 9,355,065 B2 | 5/2016 | Donahue |
| 9,365,348 B1 | 6/2016 | Agarwal et al. |
| 9,367,827 B1 | 6/2016 | Lively et al. |
| 9,367,831 B1 | 6/2016 | Besehanic |
| 9,371,184 B1 | 6/2016 | Dingle et al. |
| 9,378,482 B1 | 6/2016 | Pikler et al. |
| 9,389,609 B1 | 7/2016 | Mountz et al. |
| 9,389,612 B2 | 7/2016 | Bernstein et al. |
| 9,389,614 B2 | 7/2016 | Shani |
| 9,394,016 B2 | 7/2016 | Bernstein et al. |
| 9,395,725 B2 | 7/2016 | Bernstein et al. |
| 9,404,756 B2 | 8/2016 | Fong et al. |
| 9,405,016 B2 | 8/2016 | Yim |
| 9,427,874 B1 | 8/2016 | Rublee |
| 9,429,940 B2 | 8/2016 | Bernstein et al. |
| 9,429,944 B2 | 8/2016 | Filippov et al. |
| 9,436,184 B2 | 9/2016 | DAndrea et al. |
| 9,440,790 B2 | 9/2016 | Mountz et al. |
| 9,448,560 B2 | 9/2016 | DAndrea et al. |
| 9,451,020 B2 | 9/2016 | Liu et al. |
| 9,452,883 B1 | 9/2016 | Wurman et al. |
| 9,457,730 B2 | 10/2016 | Bernstein et al. |
| 11,004,033 B1 | 5/2021 | Theobald et al. |
| 2006/0245893 A1 | 11/2006 | Schottke |
| 2010/0234990 A1 | 9/2010 | Zini et al. |
| 2010/0300841 A1 | 12/2010 | OBrien |
| 2012/0321423 A1 | 12/2012 | MacKnight et al. |
| 2013/0058743 A1 | 3/2013 | Rebstock |
| 2013/0096735 A1* | 4/2013 | Byford ................ G05D 1/0234 701/2 |
| 2013/0302132 A1 | 11/2013 | DAndrea |
| 2014/0124462 A1 | 5/2014 | Yamashita |
| 2014/0143061 A1 | 5/2014 | Abhyanker |
| 2014/0370167 A1 | 12/2014 | Garden |
| 2015/0073589 A1 | 3/2015 | Khodl et al. |
| 2015/0117995 A1 | 4/2015 | DAndrea |
| 2015/0307278 A1 | 10/2015 | Wickham et al. |
| 2016/0090248 A1* | 3/2016 | Worsley ................ B65G 61/00 414/398 |
| 2016/0176637 A1 | 6/2016 | Ackerman et al. |
| 2016/0203543 A1 | 7/2016 | Snow |
| 2016/0232477 A1 | 8/2016 | Cortes et al. |
| 2016/0347545 A1 | 12/2016 | Lindbo et al. |
| 2017/0043953 A1 | 2/2017 | Battles et al. |
| 2017/0174431 A1 | 6/2017 | Borders et al. |
| 2018/0072404 A1 | 3/2018 | Prager et al. |
| 2018/0088586 A1* | 3/2018 | Hance ................ G06Q 10/0832 |
| 2018/0089616 A1* | 3/2018 | Jacobus ........... G06K 19/07758 |
| 2018/0155029 A1 | 6/2018 | Gil |
| 2018/0341904 A1 | 11/2018 | Aleman et al. |
| 2019/0143872 A1 | 5/2019 | Gil |
| 2020/0070717 A1 | 3/2020 | Garden et al. |
| 2020/0103882 A1* | 4/2020 | Sullivan ................ B66F 9/063 |
| 2021/0125146 A1 | 4/2021 | Tazume |

FOREIGN PATENT DOCUMENTS

| | | |
|---|---|---|
| CA | 1228142 A | 10/1987 |
| CA | 1238103 A | 6/1988 |
| CA | 1264490 A | 1/1990 |
| CA | 1267866 A | 4/1990 |
| CA | 1269740 A | 5/1990 |
| CA | 1271544 A | 7/1990 |
| CA | 1275721 C | 10/1990 |
| CA | 1276264 C | 11/1990 |
| CA | 2029773 A1 | 5/1991 |
| CA | 1291725 C | 11/1991 |
| CA | 2036104 A1 | 11/1991 |
| CA | 2042133 A1 | 1/1992 |
| CA | 2049578 A1 | 2/1992 |
| CA | 2296837 A1 | 2/1992 |
| CA | 2094833 A1 | 4/1992 |
| CA | 1304043 C | 6/1992 |
| CA | 2095442 A1 | 6/1992 |
| CA | 1304820 C | 7/1992 |
| CA | 1323084 C | 10/1993 |
| CA | 2189853 A1 | 11/1995 |
| CA | 2244668 A1 | 3/1999 |
| CA | 2469652 A1 | 6/2003 |
| CA | 2514523 A1 | 8/2004 |
| CA | 2565553 A1 | 11/2005 |
| CA | 2577346 A1 | 4/2006 |
| CA | 2613180 A1 | 1/2007 |
| CA | 2921584 A1 | 1/2007 |
| CA | 2625885 A1 | 4/2007 |
| CA | 2625895 A1 | 4/2007 |
| CA | 2837477 A1 | 4/2007 |
| CA | 2864027 A1 | 4/2007 |
| CA | 2636233 A1 | 7/2007 |
| CA | 2640769 A1 | 8/2007 |
| CA | 2652114 A1 | 12/2007 |
| CA | 2654258 A1 | 12/2007 |
| CA | 2654260 A1 | 12/2007 |
| CA | 2654263 A1 | 12/2007 |
| CA | 2654295 A1 | 12/2007 |
| CA | 2654336 A1 | 12/2007 |
| CA | 2654471 A1 | 12/2007 |
| CA | 2748398 A1 | 12/2007 |
| CA | 2748407 A1 | 12/2007 |
| CA | 2750043 A1 | 12/2007 |
| CA | 2781624 A1 | 12/2007 |
| CA | 2781857 A1 | 12/2007 |
| CA | 2838044 A1 | 12/2007 |
| CA | 2866664 A1 | 12/2007 |
| CA | 2921134 A1 | 12/2007 |
| CA | 2663578 A1 | 4/2008 |
| CA | 2860745 A1 | 4/2008 |
| CA | 2671955 A1 | 7/2008 |
| CA | 2673025 A1 | 7/2008 |
| CA | 2674241 A1 | 7/2008 |
| CA | 2691710 A1 | 12/2008 |
| CA | 2721345 A1 | 10/2009 |
| CA | 2760127 A1 | 11/2009 |
| CA | 2760225 A1 | 11/2009 |
| CA | 2743706 A1 | 6/2010 |
| CA | 2754626 A1 | 9/2010 |
| CA | 2765565 A1 | 1/2011 |
| CA | 2932535 A1 | 1/2011 |
| CA | 2932537 A1 | 1/2011 |
| CA | 2770139 A1 | 2/2011 |
| CA | 2773963 A1 | 3/2011 |
| CA | 2778111 A1 | 5/2011 |
| CA | 2784874 A1 | 7/2011 |
| CA | 2868578 A1 | 7/2011 |

(56) References Cited

FOREIGN PATENT DOCUMENTS

| | | |
|---|---|---|
| CA | 2806852 A1 | 2/2012 |
| CA | 2823715 A1 | 7/2012 |
| CA | 2827281 A1 | 8/2012 |
| CA | 2827735 A1 | 8/2012 |
| CA | 2770715 A1 | 9/2012 |
| CA | 2770918 A1 | 9/2012 |
| CA | 2831832 A1 | 10/2012 |
| CA | 2836933 A1 | 12/2012 |
| CA | 2851774 A1 | 4/2013 |
| CA | 2799871 A1 | 6/2013 |
| CA | 2866708 A1 | 9/2013 |
| CA | 2938894 A1 | 9/2013 |
| CA | 2813874 A1 | 12/2013 |
| CA | 2824189 A1 | 2/2014 |
| CA | 2870381 A1 | 4/2014 |
| CA | 2935223 A1 | 4/2014 |
| CA | 2894546 A1 | 6/2014 |
| CA | 2845229 A1 | 9/2014 |
| CA | 2899553 A1 | 10/2014 |
| CA | 2882452 A1 | 8/2015 |
| CA | 2886121 A1 | 10/2015 |
| WO | 2012154872 A2 | 11/2012 |
| WO | 2016015000 A2 | 1/2016 |

OTHER PUBLICATIONS

US 9,050,932 B2, 06/2015, Bernstein et al. (withdrawn)
US 9,342,073 B2, 05/2016, Bernstein et al. (withdrawn)
Warehouse Robots at Work, IEEE Spectrum,. Jul. 21, 2008, YouTube https://www.youtube.com/watch?v=IWsMdN7HMuA.
International Search Report and Written Opinion, PCT/US2017/054627, dated Jan. 5, 2018 (15 pages).
International Search Report and Written Opinion, PCT/US2018/012645, dated Mar. 7, 2018 (13 pages).
International Search Report and Written Opinion, PCT/US2018/012641, dated Mar. 7, 2018 (17 pages).

* cited by examiner

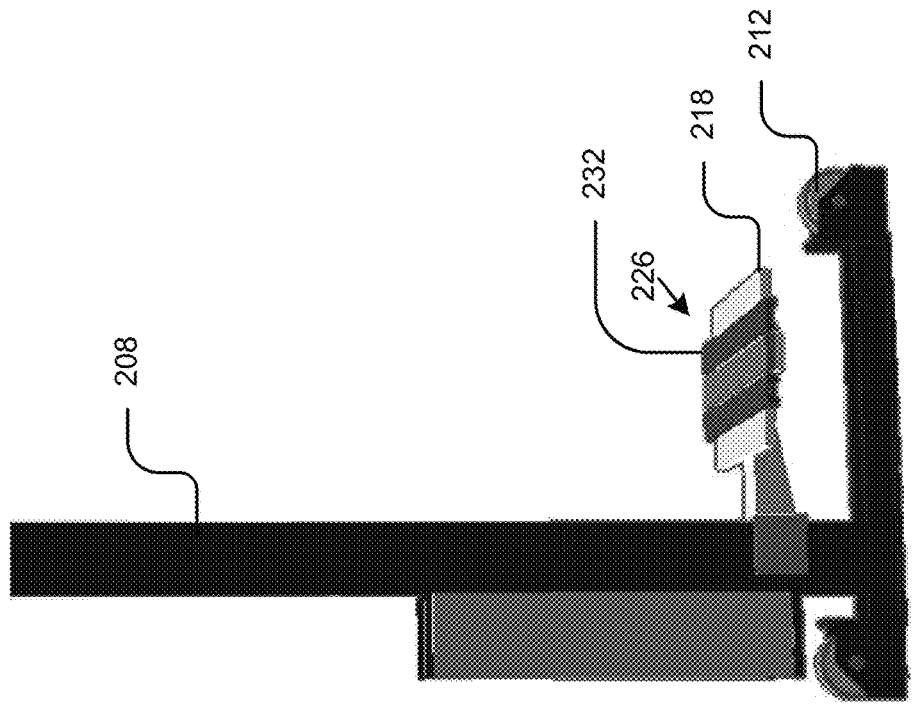

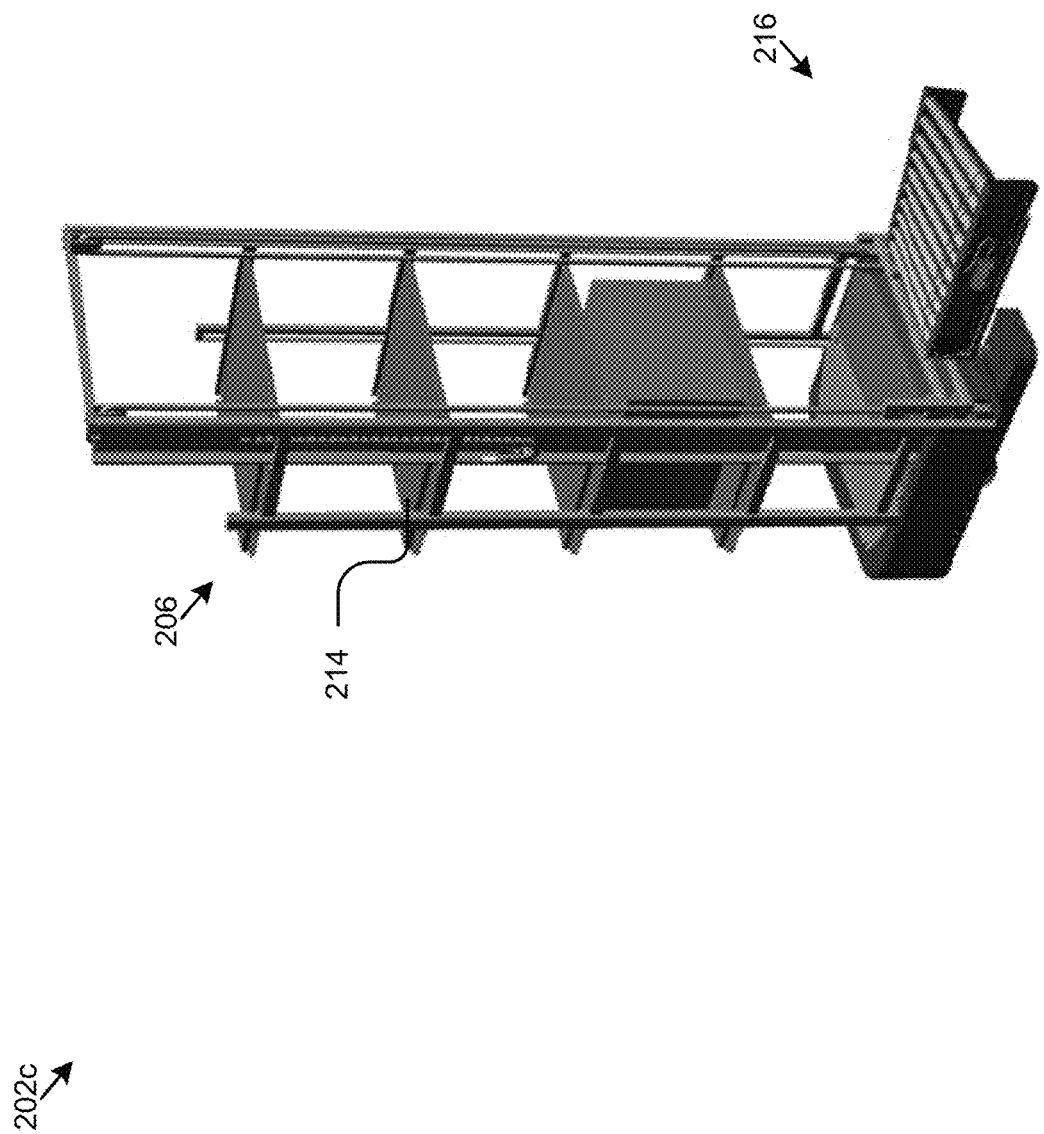

AUTOMATED LOADING OF DELIVERY VEHICLES USING AUTOMATED GUIDED VEHICLES

BACKGROUND

This application relates to automated preparation of delivery vehicles. For example, this application relates to automated guided vehicles used to load items into delivery vehicles.

A delivery vehicle may receive, transport, and deliver tens or even hundreds of orders containing numerous individual items, which may be loaded from fulfillment centers, warehouses, stores, or other facilities. Some current delivery loading systems use hand trucks or dollies, which are manually loaded with boxes or other items, pulled or pushed by a human into a delivery truck, and then manually unloaded onto shelves in the delivery truck. However, when performing such tasks, humans quickly become physically and mentally tired leading them to work inefficiently, commit errors, and require breaks or work at a slower pace. Further, these solutions require sufficient space within the delivery vehicle for a human to move around, carry items, and, potentially, drag a hand truck, which wastes space in the delivery vehicle.

Some delivery vehicle loading solutions use forklifts to move entire pallets of items, however these solutions are not practical when fulfilling many orders that include, for instance, only a few items while a pallet may include tens or hundreds of items. Further, traditional forklifts are not able to navigate within or adjacent to delivery vehicles, because traditional forklifts require substantial space to manipulate a pallet.

Further, tracking which items are loaded onto the delivery vehicle, in what order the items are loaded, or where the items are placed in the delivery vehicle is typically done with pen and paper, with basic software applications that essentially consist of digital checklists, or not done at all. These paper or software tracking solutions require a human to decide how to load the items into the delivery vehicle (e.g., onto which shelves a particular item should be placed), manually load the items, and then update the checklist. However, humans may forget to update the checklist or may place items in a delivery vehicle in inefficient locations, thereby reducing storage and delivery efficiency.

Accordingly, improved delivery vehicle preparation solutions are desirable.

SUMMARY

The technology may include a loading coordination system including: an automated guided vehicle ("AGV"); a delivery vehicle; a computing system including one or more processors and a memory storing instructions that, when executed by the one or more processors, cause the loading coordination system to: determine a delivery destination of a first item based on item data associated with the first item; assign the first item to a location in the delivery vehicle; generate a task list including an instruction to the AGV to position the first item in the delivery vehicle based on the assigned location in the delivery vehicle; navigate the AGV to a loading area to retrieve the first item from the loading area; navigate the AGV to a point proximate to the assigned location in the delivery vehicle; and instruct the AGV to place the first item at the assigned location based on the task list. Other embodiments of this aspect include corresponding computer systems, apparatus, and computer programs recorded on one or more computer storage devices, each configured to perform the actions of the methods.

Implementations may include one or more of the following features. The system where assigning the first item to the location in the delivery vehicle is based on the delivery destination determined for the first item. The system where the instructions, when executed by the one or more processors, further cause the loading coordination system to determine a set of items assigned to the delivery vehicle, the set of items including the first item, determine a sequence of deliveries of the set of items, the sequence of deliveries being based on delivery destinations of the set of items, determine the assigned location in the delivery vehicle for each item in the set of items based on the sequence of deliveries and available storage locations in the delivery vehicle, and instruct the AGV to put each item of the set of items at the assigned location of the item in the delivery vehicle. The system where determining the delivery destination of the first item includes capturing a label of the first item, and determining, based on the captured label on to the first item, the delivery destination. The system where the instructions, when executed by the one or more processors, further cause the loading coordination system to assign the first item to a door dock associated with the delivery vehicle based on the delivery destination of the first item, and instruct, by the computing system, a conveyor mechanism to transport the first item to the door dock associated with the delivery vehicle. The system where assigning the first item to the location in the delivery vehicle includes determining one or more measurements of the first item, determining one or more measurements of available storage locations in the delivery vehicle, determining a position of a delivery of the first item in a sequence of deliveries of a set of items assigned to the delivery vehicle, and determining the assigned location of the first item based on the one or more measurements of the first item, the one or more measurements of the available storage locations in the delivery vehicle, and the position of the delivery of the first item in the sequence of deliveries. The system where the delivery vehicle includes a stabilizing mechanism adapted to impede movement of the AGV within the delivery vehicle. The system where the AGV includes a stabilizing mechanism interface interacting with the stabilizing mechanism of the delivery vehicle, the stabilizing mechanism interface and stabilizing mechanism stabilizing the AGV during acceleration of the delivery vehicle. The system where the delivery vehicle includes a shelf at the assigned location, the shelf including a mechanism adapted to transport items between a first side of the shelf that is proximate to the AGV and a second side of the shelf that is distal from the AGV. The system where the AGV includes a drive unit that provides motive force to the AGV, a guidance system that locates the AGV in the delivery vehicle, and an item handling mechanism adapted to move items.

Other implementations of one or more of these aspects include corresponding systems, apparatus, and computer programs, configured to perform the actions of the methods, encoded on computer storage devices.

It should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

FIGS. 2A-2E are illustrations of example automated guided vehicles.

DESCRIPTION

Figure 1:
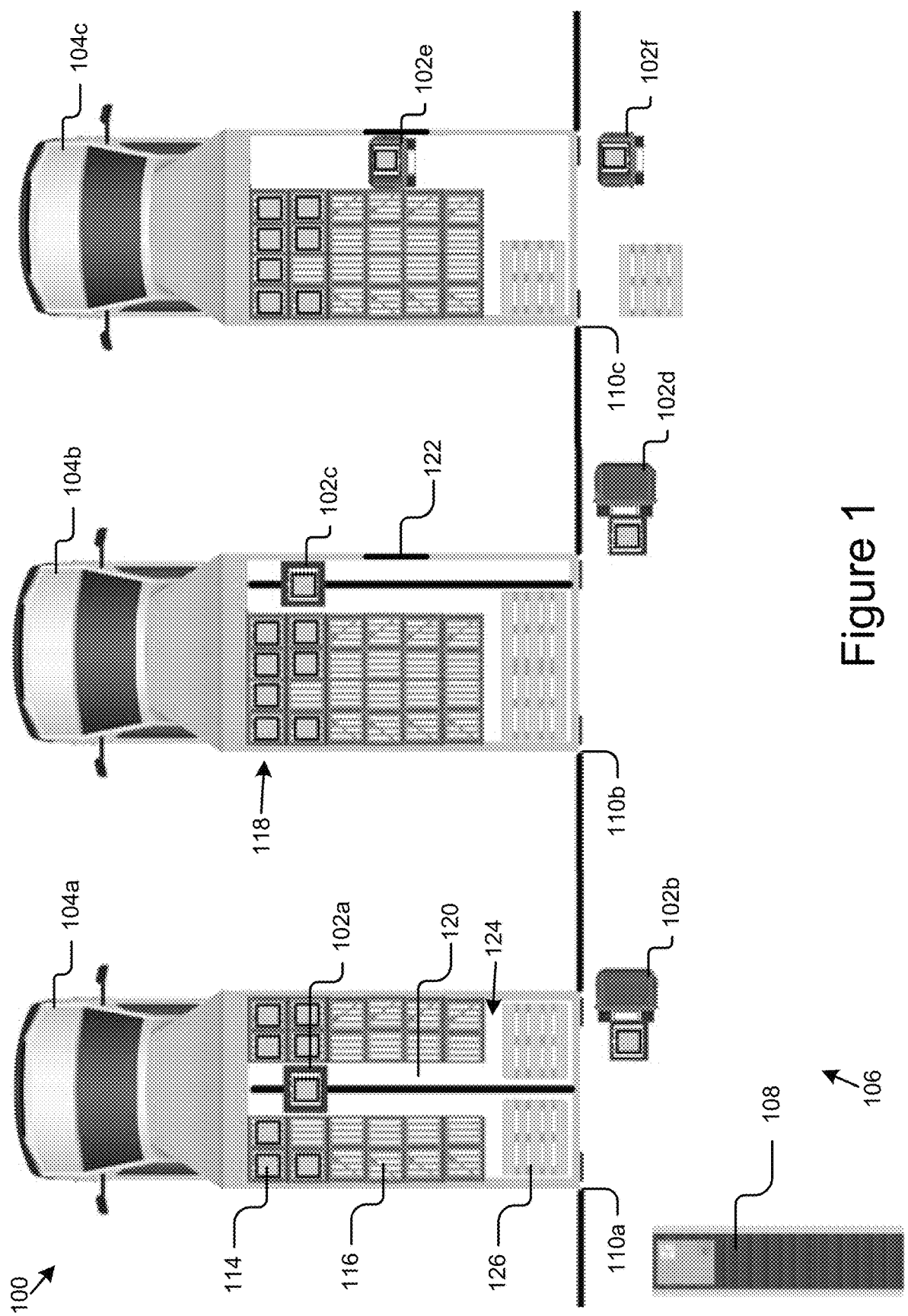
FIG. 1 is an illustration of an example delivery vehicle and automated guided vehicle loading layout.

Among other benefits, the technology described herein improves upon the technology described in the Background Section. For instance, the technology provides robotic devices, systems, methods, and other aspects that can more efficiently prepare delivery vehicles 104. The technology may automate storage and retrieval of items in a delivery vehicle 104 using robotic technology that, in some implementations, may travel with the delivery vehicle 104 to support delivery operations. For instance, the technology described herein describes example automated guided vehicles ("AGVs") 102 that efficiently carry items. An item may be a physical object, such as a product, box or container of products, etc. Some implementations of the technology described herein may include a system and method that includes determining locations of items in a particular delivery vehicle 104 and autonomously manipulating the items to place them in the determined locations by an AGV 102.

Some implementations of the AGV 102 may load items in the delivery vehicle 104 and, in some instances, may be installed, loaded, or embedded into the delivery vehicle 104 to support shipping and delivery operations. Further, some implementations may include advancements to computing systems, computer logic, conveyor mechanisms 108, scanners, guidance systems, and shelving systems for supporting the preparation of delivery vehicles 104 using the AGVs 102, as described in further detail elsewhere herein. Further, according to some implementations, hardware and computer logic aspects of the technology work together to execute tasks described herein and solve the problems discussed in the Background, for example.

The technologies described herein are beneficial over the previous solutions described in the Background at least because the algorithms and devices may automatically determine storage locations within a delivery vehicle 104 such that items may be efficiently loaded into the delivery vehicle. For instance, the operations and devices described herein may reduce the shuffling of items, distance moved by an AGV 102, time expended for retrieving the items during delivery, time expended loading items into the delivery vehicle 104, and/or space used by the items. For example, the systems and logic described herein may identify a list of locations for delivery, sort the items, and generate a task list for an AGV 102 to place the items in the delivery vehicle 104 in an efficient manner, thereby accurately and automatically tracking items loaded into a delivery vehicle 104, optimizing space utilization, optimizing delivery efficiency, and decreasing physical and mental fatigue of human workers.

Further, the technology described herein may allow an AGV 102 to autonomously prepare a delivery vehicle 104 by autonomously loading items to designated locations in the delivery vehicle 104, thereby reducing physical fatigue of human workers. The technologies beneficially improve productivity, increase asset utilization, and lower cycle time and labor costs. These benefits, in turn, lead to shorter delivery times and result in significant savings and business value.

With reference to the figures, reference numbers may be used to refer to components found in any of the figures, regardless whether those reference numbers are shown in the figure being described. Further, where a reference number includes a letter referring to one of multiple similar components (e.g., component 000a, 000b, and 000n), the reference number may be used without the letter to refer to one or all of the similar components.

FIG. 1 is an illustration of an example delivery vehicle and automated guided vehicle loading environment 100. As illustrated, the example environment may include a loading bay 106 with door docks 110*a* . . . 110*c* at which delivery vehicles 104*a* . . . 104*c* may be parked, one or more AGVs 102*a* . . . 102*f* preparing the delivery vehicles 104 with items to be delivered (or, in some implementations, receiving items being delivered by the delivery vehicles 104), and, in some implementations, one or more conveyor mechanisms 108 configured to bring items to the loading bay 106. As discussed in further detail elsewhere herein, some or all of the components of the environment may include communication devices and computer logic allowing coordination of the components in order to more effectively autonomously load the delivery vehicles 104. It should be noted that the example environment illustrated in FIG. 1 may be modified with additional or fewer components or a different layout without departing from the scope of this disclosure.

A delivery vehicle 104 may include a truck (e.g., a box truck), trailer (e.g., connected with a truck), van, autonomous vehicle, etc. The delivery vehicle 104 includes a storage area 124 in which items may be placed (e.g., using an AGV 102, as discussed herein) for transportation to delivery destinations. As illustrated in FIG. 1, an item may include a carton 114, although it should be understood that an item may be any physical object.

Figure 8:
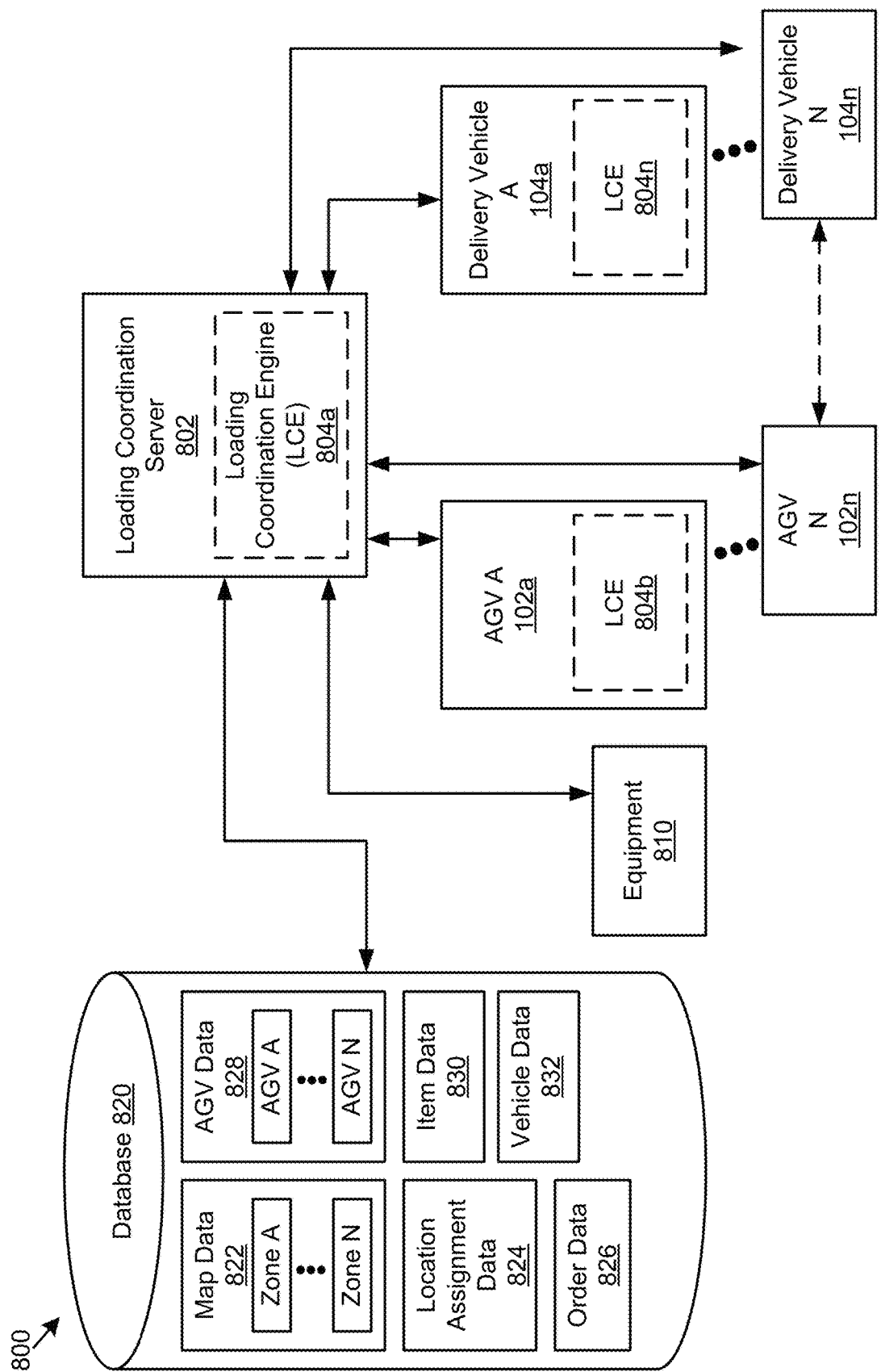
FIG. 8 is a block diagram of an example loading coordination system and data communication flow for automated loading of delivery vehicles using automated guided vehicles.

In some implementations, the delivery vehicle 104 may include a computing system that may communicate with other components of the loading coordination system and may, in some instances, perform some operations described in reference to the loading coordination engine 804 (e.g., as described in reference to FIG. 8). For example, the computing system of the delivery vehicle 104 may transmit information to an AGV 102 associated with the delivery vehicle 104, as described below.

The storage area 124 may include one or more doors, such as a side door, back door, front door (e.g., in a cab of the delivery vehicle 104) or even top door, which, in some instances, may be tied to defined operations. For example, a side door may be used for loading or deliveries at locations without loading/unloading docks (e.g., at a curbside), a back door may be used for loading or deliveries at locations with loading/unloading docks, a front door may load items directly into or adjacent to a cab of the delivery vehicle 104, and a top door may be used with an aerial drone to deliver items from the delivery vehicle 104. The delivery doors may be associated with delivery destinations and used by the loading coordination engine 804 to determine placement locations of the items inside of the storage area of the delivery vehicle 104 and, in some implementations, define to which door an AGV 102 may bring items during delivery. For instance, the AGV 102 may automatically place items in the delivery vehicle 104 based on the specific door that is used during delivery, as described in further detail in reference to FIG. 6.

In some implementations, the storage area 124 of the delivery vehicle 104 may include a designated compartment or station (e.g., associated with a top door) into which an AGV 102 may place items during delivery to feed a drone (not shown), which may then transport the item to a delivery location from the delivery vehicle 104. For example, a delivery drone may be permitted to leave the delivery vehicle 104 when the speed of the delivery vehicle 104 is below a defined threshold, when the delivery vehicle 104 is within a threshold distance from the delivery destination, based on the charge state of the drone, and/or using other criteria.

Figure 3:
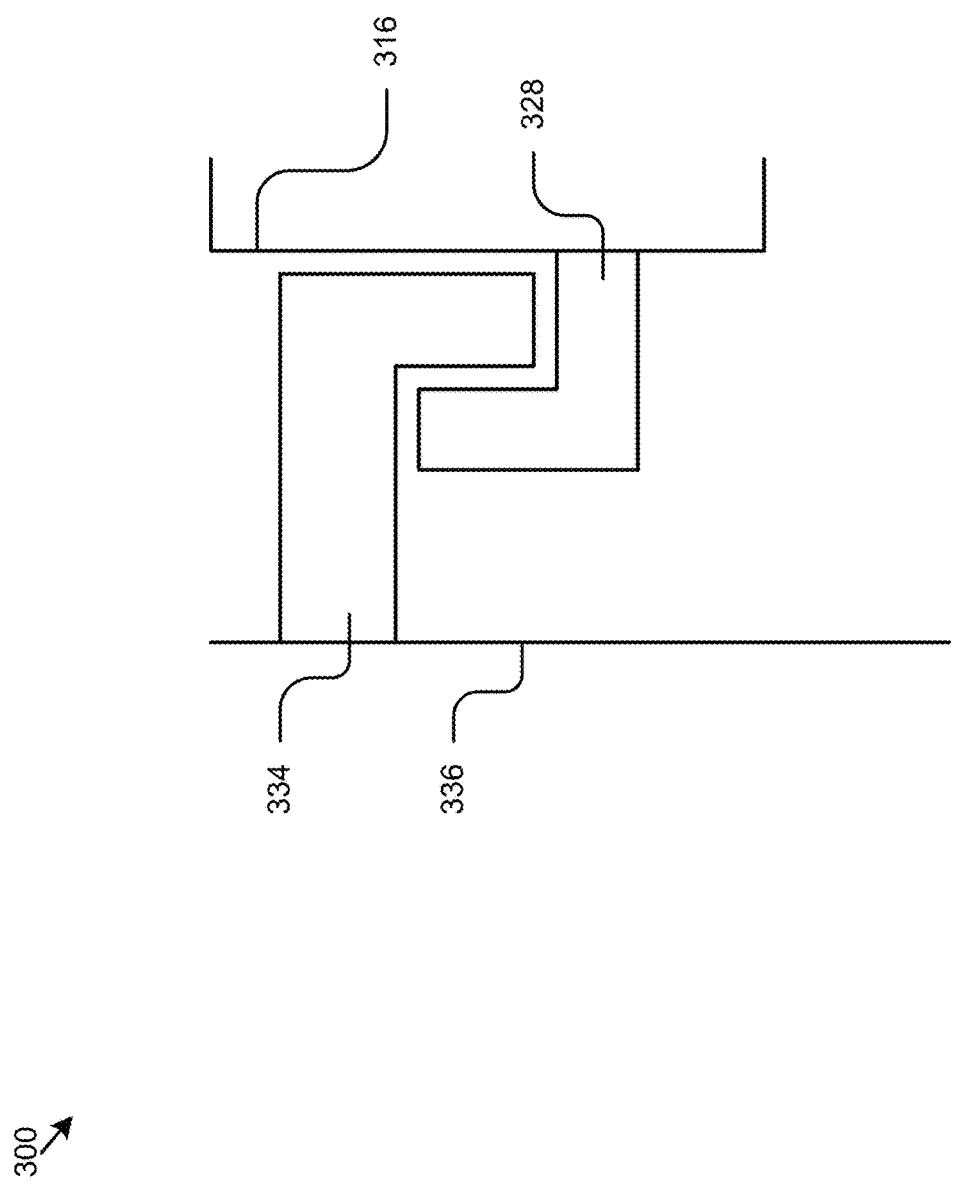
FIG. 3 is an illustration of an example stability mechanism for use with some implementations of automated guided vehicles and delivery vehicles.

The storage area 124 of the delivery vehicle 104 may include a stability mechanism adapted to impede certain movement of the AGV 102 within the delivery vehicle 104, for example, the stability mechanism may include rails, hooks, magnets, etc., for example, as described in reference to FIG. 3.

The storage area 124 of the delivery vehicle 104 may include one or more shelves 116, which may be adapted to hold multiple items deep (e.g., between an aisle 120 of the storage area 124 and a wall of the storage area 124), as shown at 118 in the delivery vehicle 104b in FIG. 1. In some implementations, the storage shelves 116 may be arranged along one side of the storage area 124, for example, the shelves 116 may be on the left side of the storage area 124 to enable movement of the AGV 102 along the right side and access of the AGV 102 to place items next to a right hand delivery door 122 (e.g., as illustrated in example delivery vehicles 104b and 104c). In some implementations, the shelves 116 may be arranged along both the left and right side of the storage area 124 (e.g., as illustrated in example delivery vehicle 104a), so that the AGV 102 may travel down the center of the storage area 124 thereby reducing the distance between the items placed in the back (e.g., distal from the AGV 102 and proximate to wall of the storage area 124) of a shelf 116 and the front of a shelf 116. In some implementations, a shelf 116 may include a mechanism adapted to transport items between a first side of the shelf 116 proximate to the AGV 102 and a second side of the shelf 116 distal from the AGV 102 so that items can be stored multiple items deep, for example, as illustrated at 118. An example implementation of the shelves 116 is described in reference to the shelves 406 and shelving unit 402 illustrated in FIG. 4.

In some implementations, the storage area 124 of a delivery vehicle 104 may also include designated storage places for one or more pallets 126, for example, for larger orders.

In some implementations, the storage area 124 of a delivery vehicle 104 may include components used in an AGV 102 guidance system of an AGV 102 to locate itself, its item handling mechanism (IHM) 216, and/or items in the delivery vehicle 104. For example, the AGV 102 guidance system may include beacons, QR codes or other symbols, etc., for providing location information to the AGV 102. For example, the symbols or beacons may be placed on the floor, ceiling, walls, or shelves 116 in the storage area 124. In some implementations, as described in further detail in reference to the example AGVs 202 described in reference to FIGS. 2A-2E, an AGV 102 may have an optical or radio sensor for reading the symbols or beacons, which may thereby be used to determine the location and identification of the symbols or beacons and therefore the AGV 102.

In some implementations, a delivery vehicle 104 may include a computing system that communicates with a loading coordination server 802 and/or AGV 102, for example, as described in reference to FIG. 8. The delivery vehicle computing system may include an in-dash computing system, tablet computer, smartphone, laptop, vehicle control unit, or other computing device. In some implementations, the delivery vehicle computing system may perform operations of the loading coordination engine 804 described herein. In some instances, the delivery vehicle computing system may communicate information with an AGV 102 associated with the delivery vehicle 104 (e.g., in the storage area 124 of the delivery vehicle 104). For example, the delivery vehicle computing system and AGV 102 may communicate location, speed, acceleration, current or next delivery, which delivery door to use for a particular delivery, and/or other information.

In some implementations, the delivery vehicle computing system may include or communicate with a location system, such as a global positioning system device (GPS), an accelerometer, or another device capable of determining the location of the vehicle. For example, the delivery vehicle computing system may determine and transmit location information for a particular upcoming delivery to the AGV 102, so that the AGV 102 can prepare an item for delivery in response to a given trigger (e.g., within a defined range, time period, etc., from a delivery destination). In another example, the delivery vehicle computing system may provide speed, location, acceleration, or other context information to the AGV 102, in response to which, the AGV 102 may cease moving, secure an item that it is manipulating, or otherwise secure itself in place using a stabilizing mechanism.

An AGV 102 is an automated guided vehicle or robot that may be configured to autonomously manipulate items, for example, for use with a delivery vehicle 104, as described herein. In some implementations, the AGV 102 may be a robot or material handling equipment inside a delivery vehicle 104 to move items around. In some implementations, the AGV 102 may use (e.g., be guided by, be stabilized by, or use for navigation) a rail, track, or other guiding or stabilizing mechanism mounted to the floor, wall, or ceiling of the delivery vehicle 104, for example, as described in reference to FIG. 3.

The AGV 102 may include a drive unit adapted to provide motive force to the AGV 102, a guidance system adapted to locate the AGV 102 in the delivery vehicle 104 and/or the loading bay 106, and an IHM 216 (e.g., as described in reference to FIGS. 2A-2E). For example, the IHM 216 of an AGV 102 may retrieve an item from a shelf 116, conveyor mechanism 108, pallet 126, or other loading area, transport the item, manipulate the item, and/or place the item at a designated location, such as on a shelf 116 in a delivery vehicle 104 or delivery preparation area. A loading area may be any location from which an item may be retrieved by the AGV 102, such as at the door of a delivery vehicle 104, at a conveyor mechanism 108, on a shelf (e.g., 116, 406, or another shelf), or another defined location. Example implementations of AGVs 102 are described in further detail in reference to FIGS. 2A-2E.

In some implementations, as illustrated in FIG. 1, an AGV 102a may travel down the center of a delivery vehicle 104a with shelves 116 flanking it on both sides. For instance, the AGV 102a may run along a rail, track, or other stabilizing mechanism guiding it within the delivery vehicle 104a in the aisle 120.

In some implementations, the loading environment 100 may include a conveyor mechanism 108 for bringing items to the loading bay 106. For example, the conveyor mechanism 108 may include a conveyor belt, roller wheels, skate wheel conveyor, etc., or may include another device, such as an AGV 102 configured to bring items to the loading bay 106 from a warehouse, for example. The conveyor mechanism 108 may be motor driven or may be driven by gravity, etc. The conveyor mechanism 108 may include handling mechanisms to route items to different door docks 110, etc. In some implementations, the conveyor mechanism 108 may include or be coupled with scanners that scan items to determine their attributes. For example, a scanner may scan a label on the item, and, based on the content of the label, the loading coordination engine 804 may track an item or determine attributes of the item, such as its delivery destination, weight, dimensions, priority, appropriate delivery vehicle door, etc.

The loading coordination engine 804 may use computer logic to coordinate execution of tasks among the components of the loading coordination system 800. For example, the loading coordination engine 804 may route items among a conveyor mechanism 108, AGV(s) 102, and delivery vehicle 104. In some instances, the loading coordination engine 804 may also communicate with a computing system of a warehouse, store, or fulfillment center where the loading bay 106 is located in order to prepare items and coordinate the components of the loading coordination system 800 with the operations of the warehouse, store, or fulfillment center. Details of the operations of the loading coordination system 800 are described in further detail in reference to the flowcharts herein, for example.

In some implementations, the loading coordination engine 804 may direct a conveyor mechanism 108 to bring a particular item to the loading bay 106, while in some implementations, a scanner communicatively coupled with the loading coordination engine 804 may scan an item on the conveyor mechanism 108 thereby determining its attributes (e.g., a delivery vehicle 104, a location in a delivery vehicle 104, its size, etc.).

As illustrated, in some implementations, the loading coordination engine 804 may direct a first AGV 102b to retrieve an item from the conveyor mechanism 108, transport the item to a loading area, and put the item at the loading area (or directly on a second AGV 102a). The second AGV 102a may then retrieve the item from the loading area (or directly from the first AGV 102a), transport the item within the delivery vehicle 104a, and place the item at a determined location in the delivery vehicle 104a. In some implementations, the AGV 102 or an item displacement mechanism may move the item on the shelf 116 to make room for additional items on the shelf 116. For instance, as described in reference to FIG. 4, a shelf 116 (e.g., a shelving unit 402 or shelf 406) may include an item displacement mechanism that moves items to designated locations (e.g., deeper in the shelf 116) to make room for more items. For instance, the mechanism may include a motor coupled with a belt or rollers, a gear driven by the AGV 102 which then drives the rollers, or simple rollers across which the AGV 102 can push (or pull) an item, although it should be understood that these implementations are provided as examples.

As another example illustrated in FIG. 1, an AGV 102c may travel down a side (e.g., in an off-center aisle in the storage area 124) of a delivery vehicle 104b with the shelf(ves) 116 to one side. As illustrated, the AGV 102c may run along a rail, track, or other stabilizing mechanism guiding it within the delivery vehicle 104b. In some implementations, another AGV 102d may coordinate with the AGV 102c to load (or unload) the delivery vehicle 104b, for example, as described above in reference to AGVs 102a and 102b and delivery vehicle 104a. For example, an AGV 102c may travel down the right side of the delivery vehicle 104c in order to retrieve items from shelving and place them to the right side of the delivery vehicle 104c (e.g., at a side door 122 or at a right side of a back door of the delivery vehicle 104c), so that a delivery person retrieving the item from the delivery vehicle 104c would be further from traffic on a roadway at the left of the delivery vehicle. It should be noted that this may be reversed, for example, for right-hand drive cars or for other design constraints.

In a third example illustrated in FIG. 1, one or more AGVs 102e and/or 102f may travel between the loading bay 106 (e.g., at a conveyor mechanism 108 or other loading area) and the inside of the delivery vehicle 104c. For instance, an AGV 102e may transport items from a loading area at a conveyor mechanism 108 to a designated location (e.g., on a shelf) in the delivery vehicle 104c, or multiple AGVs 102 may coordinate to transport an item between the conveyor mechanism 108 and the destination in the delivery vehicle 104c. For instance, the loading coordination engine 804 may coordinate the timing, placement, and movement of the items, AGV 102 workload, conveyor mechanism 108 workload, etc., to bring items to various locations during the same time window, as described in further detail herein. The process for loading items in delivery vehicles 104 using AGVs 102 may be repeated as necessary, depending on the number of items to be placed in the delivery vehicle(s) 104.

Example AGVs 102 are described in further detail in reference to FIGS. 2A-2E. By way of example, the AGVs 102b, 102d, 102e, and 102f may be of the type described in reference to AGV 202a in FIG. 2A; the AGVs 102a and 102c may be of the type described in reference to AGV 202b in FIG. 2B; and the 102b, 102d, 102e, and 102f may be of the type described in reference to AGV 202c in FIG. 2C; although, it should be understood that these implementations are provided by way of example and that other implementations are possible and contemplated herein.

It should be noted that the operations described in reference to FIG. 1 are provided by way of example and that other implementations are possible and contemplated herein.

Figure 2A:
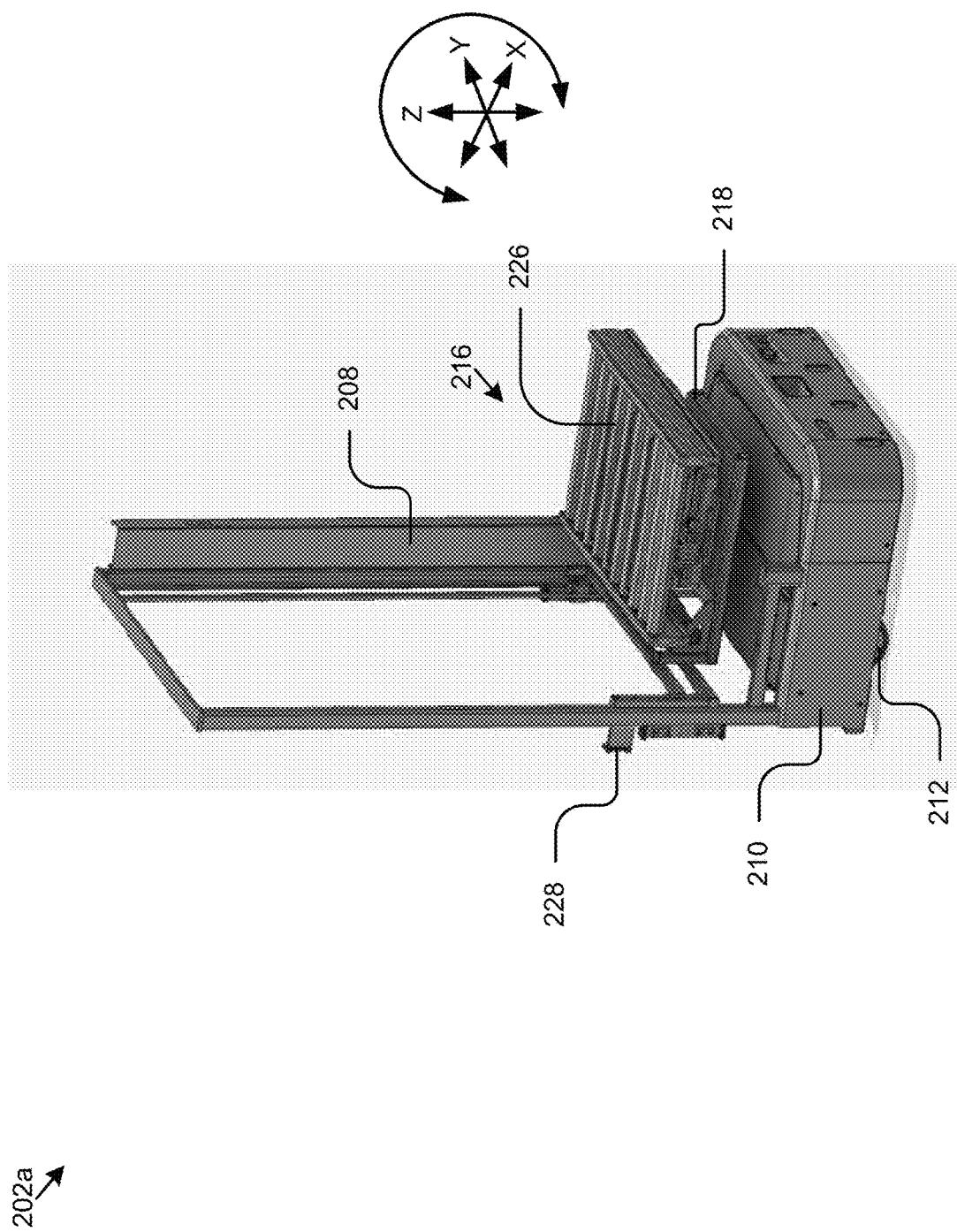

FIGS. 2A-2E are illustrations of example AGVs 202 according to some implementations described herein. FIG. 2A depicts an example AGV 202a, which may include an AGV body 210, a drive unit 212 housed within or coupled to the body 210, a power source (not shown) housed within or coupled to the body 210, a stability mechanism (or interface 228 for a stability mechanism), an IHM 216, a guidance system (not shown), and one or more controllers (not shown), although other configurations are possible and contemplated herein. Depending on the implementation, some or all of the features and operations of the example AGVs 202a, 202b, 202c, and 202d discussed in reference to FIGS. 2A-2E may be interchanged, omitted, duplicated, or replaced. For example, a feature discussed in reference to the example AGV 202a in FIG. 2A may be used with the AGV 202b in FIG. 2B, or a feature discussed in reference to the example AGV 202b in FIG. 2B may be used with the example AGV 202a in FIG. 2A. Further, some features may be described in reference to one of the figures herein (e.g., FIGS. 2A-2E), but not the other figures in order to simplify the description and reduce repetition, although they may be applicable to some or all of the figures.

The body 210 may include a front, a rear opposing the front, a left side extending from the front to the rear, and a right side opposing the left side and extending from the front to the rear. While various shapes and construction materials to the body 210 are possible, the body 210 may be configured to fit between rows of shelving in a delivery vehicle 104, between shelving and a wall of the delivery vehicle 104, etc. The body 210 may be configured to house a drive unit 212, power source, controller, and/or other components of the AGV 202a.

The drive unit 212 may be coupled to the body 210 and configured to receive power from the power source to provide motive force to the AGV 202a and propel the AGV 202a within an operating environment. In some implementations, the drive unit 212 may receive instructions from one or more controllers instructing the drive unit 212 to cause the AGV 202a to move forward, backward, sideways, turn, or perform another movement. In some implementations, the drive unit 212 may include electric motors and wheels, although other configurations, such as treads are possible. In some implementations, the drive unit may include wheels configured to roll along rails or a track in the delivery vehicle 104, thereby improving stability and the ability of the AGV to locate itself.

The drive unit 212 may be wirelessly coupled via a controller to a wireless interface and a wireless communications network to receive control signals from the loading coordination engine 804 and/or other components of the system 800. In some implementations, the drive unit 212 may be controlled as described in elsewhere herein, which may be executed using a distributed computing system comprising AGVs 202, servers (e.g., the loading coordination server 802), controllers, etc., for example, as shown in the system depicted in FIG. 8.

The power source may be coupled to the components of the AGV 202a to provide power to the components, for example, the power source may provide power to the IHM 216, the drive unit 212, a controller, or another component of the AGV 202a. The power source may include a battery, a wire, contact track (e.g., integrated with the stability mechanism or otherwise in the delivery vehicle 104 or loading bay 106), induction charger, alternator or gas generator, etc.

The item handling mechanism or IHM 216 may include a carrying device 226 and, in some instances, a robotic device (e.g., an elevator 208, adjustable platform 218, robotic arm, etc.) moving the carrying device 226 to, for example, retrieve items from a loading area and transport them to a designated location in a delivery vehicle 104 (e.g., on a shelf 406). In some implementations, the IHM 216 may also be configured to retrieve items from shelves 406 in a delivery vehicle 104 and place them adjacent to a door in the delivery vehicle 104, etc., as described elsewhere herein.

In some implementations, the IHM 216 may include a robotic arm, platform 218, or other device for extending a carrying device 226 from an AGV 202 to a storage shelving unit 402 that is separate from the AGV 202. In some implementations, the IHM 216 may be configured so that a carrying device 226 fits next to a shelf 406 when the AGV 202 is at a point proximate to the shelf 406, so that a carrying device 226 does not need to be extended to interact with an item on the shelf 406. In some implementations, the IHM 216 may have one, two, three, or more degrees of freedom to move the carrying device 226 along one, two, three, or more axes thereby allowing the IHM 216 to retrieve an item from a loading area and place the item at a target location, such as on a shelf 406. Similarly, in some instances, the IHM 216 may be configured to retrieve an item from a shelf 406 and place it at a second location, such as adjacent to a door or on a platform in the delivery vehicle 104 for retrieval by a delivery person or delivery AGV.

In some implementations, the IHM 216 may include a mast having an elevator 208 coupled with the body 210. The elevator 208 lifts and lowers a platform 218 supporting a carrying device 226. The elevator 208 moves the IHM 216 along a Z axis to lift and set down the item.

In some implementations, a platform 218 extends or retracts the carrying device 226 horizontally between the AGV 202a and a shelving unit 402, loading area, or delivery vehicle door. In some implementations, the platform 218 may also extend or retract the carrying device 226 into or out of one or more of AGV shelves 214 (e.g., as in the example AGV 202c illustrated in FIG. 3C) to place an item on one of the AGV shelves 214.

In some implementations, the platform 218 and/or carrying device 226 may include a set of rollers or a conveyor belt that, when stationary, hold an item in a stationary position on the AGV 202. The rollers or conveyor belt may turn, thereby moving an item sideways (e.g., in a Y direction) relative to the direction of motion of the AGV 202 and into the shelves 406 in a delivery vehicle, for example.

In some implementations, the IHM 216 includes a moveable platform 218 supporting a carrying device 226 and capable of translating the carrying device 226 along a plane in one, two, or more dimensions and/or rotating about a vertical axis. For example, the platform 218 (or other component of the IHM 216, depending on the implementation) may translate the carrying device 226 along X and/or Y coordinates (e.g., sideways/left and right relative to the front of the AGV 202a; forward and backward relative to the front of the AGV 202a; etc.).

In some implementations, the platform 218 may comprise two platforms coupled to one another, a first of which moves along a first horizontal axis and a second of which moves along a second horizontal axis perpendicular to the first horizontal axis. For instance, the first platform may be coupled with the elevator 208 and the second platform, so that the first platform may move the second platform along the first horizontal axis. The second platform may be coupled with the first platform and the carrying device 226, so that the second platform may move the carrying device 226 along the second horizontal axis.

In some implementations, the platform 218 may be configured to rotate a carrying device 226, such as the forks or rollers, so that the carrying device 226 may extend or be extended about a horizontal plane, as described above. For instance, the carrying device 226 may extend and then retract along a first horizontal axis to retrieve an item, as described above. Once the carrying device 226 has retracted, the platform 218 may rotate the carrying device 226, so that it may be extended along a second horizontal axis, for example, to place the item on a shelf 406, whether on the AGV 202, as described in reference to FIG. 2C, or in the delivery vehicle 104.

In some implementations, the IHM 216 may include a carrying device 226 in the form of forks, which may extend outward from the AGV 202 to interface with an item, for example, in a shelving unit 402, and may be retractable, so the forks may be placed at any desired height and maneuvered underneath an item and to lift the item from a shelving unit 402 during extraction of the item from the shelving unit 402 or placement of the item in the shelving unit 402.

In some implementations, the IHM 216 may include a robotic arm, which moves a carrying device 226. The robotic arm may pivotable or otherwise articulable to extend the carrying device 226 in order to lift the item from a loading area, transport it from the loading area to a designated location, and place it at the designated location. The elevator 208 may raise or lower the robotic arm to interact with various shelves 406 of a shelving unit 402.

In some implementations, the AGV 202a may include a scanner coupled with the carrying device 226, platform 218, or body 210, etc., that can read signatures or markers to determine locations of scanned objects. For example, the scanner may be an optical scanner configured to read visual identifiers (e.g., labels including a QR code, bar code, etc.) to determine with which shelf 406 (or an AGV shelf 214) the IHM 216 or the carrying device 226 is aligned. The optical scanner may scan a marker on a shelf 406 or other location in the delivery vehicle 104, for example. The shelf marker may indicate a position and/or identification of a shelf, for example.

In some implementations, the elevator 208 may include positional sensors to determine the position of IHM 216 and/or to align the carrying device 226 with a target shelf 406 (whether an external or integrated with the AGV 202, such as an AGV shelf 214).

The carrying device 226 may be coupled to or integrated with the IHM 216 and is configured to support and/or move one or more items. In some implementations, the carrying device 226 is connected at a distal end of the IHM 216. The carrying device 226 may be movable by the IHM 216 vertically, for instance. The carrying device 226 may be extendable by the IHM 216 using the range of motion to retrieve a certain item from a loading area, shelf 406, other AGV 202, etc., and place the item at a second location within reaching distance of the IHM 216.

In some implementations, the carrying device 226 may include or have attached thereto, components such as forks, a surface that may extend under an item, arms that may extend to the sides of an item to pinch or otherwise grasp the item, a crane with a claw device to lift an item, a clamp arm, motorized rollers, a conveyor belt, one or more suction cups, rollers, etc., or a combination of two or more such components. For example, a carrying device 226 may include rollers and a suction cup, the suction cup extending (e.g., on an arm) from the carrying device 226 into a shelving unit 402 to pull an item from the shelving unit 402 and onto the rollers of the carrying device (or, in some instances, push the item from the carrying device onto the shelving unit 402). The suction cup may be powered by a compressor on the AGV 202 or on the delivery vehicle 104 (e.g., feeding the suction cup through a tube coupling the delivery vehicle 104 with the suction cup and/or AGV 202). The carrying device 226 may be made of any material, such as plastic or metal, which is sufficiently strong to support an item.

In some implementations, a controller of the AGV 202 may determine attributes of an item to be picked up by the carrying device 226 and use those attributes to more accurately handle the item. For instance, the controller may read a label and/or communicate with the loading coordination engine 804 to determine dimensions and/or weights of the item thereby allowing the controller to determine, for example, a grip or suction force, or a position of the item on the carrying device 226.

In some implementations, the carrying device 226 or another component (e.g., the body 210, platform 218, or elevator 208) of the AGV 202 may include an item displacement mechanism interface that interacts with a corresponding item displacement mechanism on a shelving unit 402 to move items between a near and far side of the shelving unit 402 thereby improving the ability of a shelf 406 in the shelving unit 402 to store multiple items deep while still allowing items to be easily retrievable by the AGV 202. For instance, the item displacement mechanism interface on the AGV 202 may exert force on or otherwise signal an item displacement mechanism on the shelving unit 402 to push one or more items toward or away from the AGV 202. In some implementations, the shelving unit(s) 402 in a delivery vehicle 104 may include a plurality of item displacement mechanisms in order to move some items on the shelving unit 402 without moving all of the items on the shelving unit 402. For instance, one or more sections of one or more shelves 406 may have an item displacement mechanism.

In some implementations, the item displacement mechanism interface may include a gear coupled with the carrying device 226 that turns a gear causing a device (e.g., an item displacement mechanism) coupled with the gear to push the item toward or away from the AGV 202. For instance, the gear may turn a conveyor belt, rollers, a screw-drive assembly, etc., to push or pull the item within the shelving unit 402.

In some implementations, the item displacement mechanism interface may signal or power a motor coupled with an item displacement mechanism (e.g., a conveyor belt, rollers, a screw-drive assembly, etc.). For instance, the item displacement mechanism interface may wirelessly transmit a signal to a computing device coupled with the shelving unit 402 (e.g., in the shelving unit 402 or the delivery vehicle 104), which in turn causes the computing device to actuate the item displacement mechanism. In some implementations, the item displacement mechanism interface may include one or more electrical contacts that, when contacting corresponding contacts on the shelving unit 402, sends a signal or provides power to a motor of the item displacement mechanism, thereby causing the item displacement mechanism to move one or more items.

The AGV 202a may include a guidance system that determines a location of the AGV 202a within an operating environment (e.g., the delivery vehicle 104, loading bay 106, etc.). For instance, the guidance system may include one or more sensors that detect and process navigation markers (e.g., QR codes, RFID labels, etc.) to locate the AGV 202a while the AGV 202a traverses the operating environment. The guidance system may be coupled to a controller of the AGV 202a, which may, in some instances, include local object detection intelligence and processing to avoid collision with other objects (e.g., AGVs 202, humans, items, storage shelving units 402, etc.) in the operating environment.

In some implementations, the guidance system of the AGV 202 may include an accelerometer, GPS sensor, cellular radio, etc., to determine its location, acceleration, velocity, etc. In some implementations, the guidance system or controller of the AGV 202 may be communicatively coupled with the delivery vehicle 104 computing system to receive acceleration, location, velocity, etc., information from the delivery vehicle computing system. As discussed elsewhere herein, the AGV 202 may use this information to secure itself or an item that it is manipulating during acceleration and/or motion of the delivery vehicle 104.

The AGV 202*a* may include one or more controllers coupled with the guidance system, IHM 216, drive unit 212, loading coordination engine 804, etc., to perform operations described herein. For instance, the one or more controllers may receive a signal from the loading coordination engine 804 and, in response, may signal the drive unit 212 to propel the AGV 202*a*. The one or more controllers may communicate with the guidance system to determine a location of the AGV 202*a* within the operating environment and, using the drive unit 212, navigate through the operating environment. For example, the one or more controllers may receive a signal from the loading coordination engine 804 indicating to retrieve a particular item from a retrieval location, such as a loading area, conveyor mechanism 108, shelf 406, etc., in response to which, the one or more controllers may instruct the drive unit 212 to position the IHM 216 adjacent to the retrieval location using the current location determined by the guidance system and then direct the IHM 216 to retrieve the item, for example.

In some implementations, the AGV 202 may include a stability mechanism interface 228 that couples with a stability mechanism in the delivery vehicle 104 to secure the AGV 202 to the delivery vehicle 104. The stability mechanism and stability mechanism interface 228 are described in further detail in reference to FIG. 3.

FIG. 2B illustrates an example AGV 202*b* for placing and retrieving items in a delivery vehicle 104. The example AGV 202*b* (e.g., a drive unit 212 or stability mechanism interface 228 of the AGV 202) may be attached, via a track, rail, etc., to the floor, wall, or ceiling of the delivery vehicle 104 to provide stability to the AGV 202*b*. For instance, the drive unit may couple with a railing in the floor of the delivery vehicle 104, which railing may serve as the stability mechanism or component thereof. Accordingly, the AGV 202 may move along the railing (e.g., as illustrated in example delivery vehicles 104*a* and 104*b* in FIG. 1). It should be noted that, although only a single rail is illustrated in FIG. 1, two or more rails may be used. For instance, the floor, wall, and/or ceiling of the delivery vehicle 104 may include one or more rails.

In some implementations, the railing may provide power (e.g., electrical current) to the AGV 202. In some instances, the railing may include a pulley or cable system for pulling the AGV 202 back and forth within the delivery vehicle 104. In some instances, the drive unit 212 may include one or more wheels that run along a railing thereby keeping the AGV 202*b* stable within the delivery vehicle 104 and, in some instances, providing power to or improving the ability of the AGV 202*b* to locate itself within the delivery vehicle 104.

The example AGV 202*b* also includes an elevator 208, platform 218, and carrying device 226, as described above. As illustrated in FIG. 2B, the carrying device 226 may include a carrying surface 232, which may slide perpendicular to the direction of movement of the AGV 202*b*. In some instances, the AGV 202*b* may retrieve an item from a loading area. In some instances, a human worker, second AGV 202, conveyor mechanism 108, or another device may place the item on the carrying surface 232. For example, the carrying surface 232 may slide toward a loading area and, depending on the implementation, slide under an item to lift it from the loading area, lift the item from the loading area (e.g., by the elevator 208 lifting the carrying surface 232), and then retrieve the carrying surface 232 with the item from the loading area. The same processes may also be used to retrieve items from shelving in the AGV 202 during delivery or place the item on shelves 406 during loading.

FIG. 2C describes another example AGV 202*c* with AGV item storage rack 206 with one or more AGV shelves 214. The example AGV 202*c* may be used outside of the delivery vehicle 104 to bring items to the delivery vehicle 104 (e.g., as in example AGVs 102*b* in FIG. 1), may be used both inside and outside of the delivery vehicle 104, or used solely inside the delivery vehicle 104, for example. As illustrated, the AGV 202*c* may include an AGV item storage rack 206 with a plurality of shelves arranged vertically. The IHM 216 may also include a mast having an elevator 208 and a platform 218, which may be raised or lowered using the elevator 208. The platform 218 may extend the carrying device 226 along a first direction toward the AGV rack 206 or, perpendicularly to the first direction, toward a storage shelving unit 402 adjacent to the AGV 202, depending on the implementation.

Some implementations of the AGV 202 may include an AGV item storage rack 206 (also referred to as AGV rack 206), such as illustrated coupled with the example AGV 202*c*. While the AGV rack 206 is illustrated as coupled to the top of the body 210, other configurations are possible, for example, the AGV rack 206 may be coupled in front of, behind, to the side of, or even towed or pushed by the AGV 206. The AGV rack 206 may be positioned proximate to the IHM 216, so that the shelves 214 are within reach of the IHM 216 for the IHM 216 to place items on or retrieve items from the shelves 214.

The AGV rack 206 may include a single shelf 214 or a plurality of shelves 214 coupled to a frame. The shelves 214 may include flat surfaces, bays, containers, or other mechanisms for holding an item. Where equipped, a shelf 214 may be capable of storing the item during transit of the AGV 202.

The plurality of shelves 214 may be vertically arranged and, in some implementations, one or more of the shelves 214 may have an adjustable height (e.g., adjusted manually or automatically using a motor coupled with the AGV 202*c*) on the AGV rack 206. In some implementations, a controller of the AGV 202*c* may determine a current height of a particular shelf of the plurality of shelves 214 (or, for instance, a loading area, item, or other shelves 406), for example, using an optical scanner or retrieving a stored height of a particular shelf from a database. For example, one or more of the shelves 214 may include a marker readable by an optical scanner coupled with the IHM 216 or carrying device 226 to indicate to the IHM 216 a location or identification of the a particular shelf. In some implementations, a controller of the AGV 202*c* may store a shelf identifier for a shelf 214 in association with a height or size of the shelf 214, or an identifier of an item stored on the shelf 214.

In some implementations, a shelf 214 onto which an item is placed may be selected based on the size, height, weight capacity, or other attributes of the shelf 214. For example, an item of a given size may be placed on a shelf 214 having a corresponding size. In another example, in response to an item having a threshold weight, it may be placed on a lower shelf 214 than an item having a lighter weight than the threshold.

Figure 4:
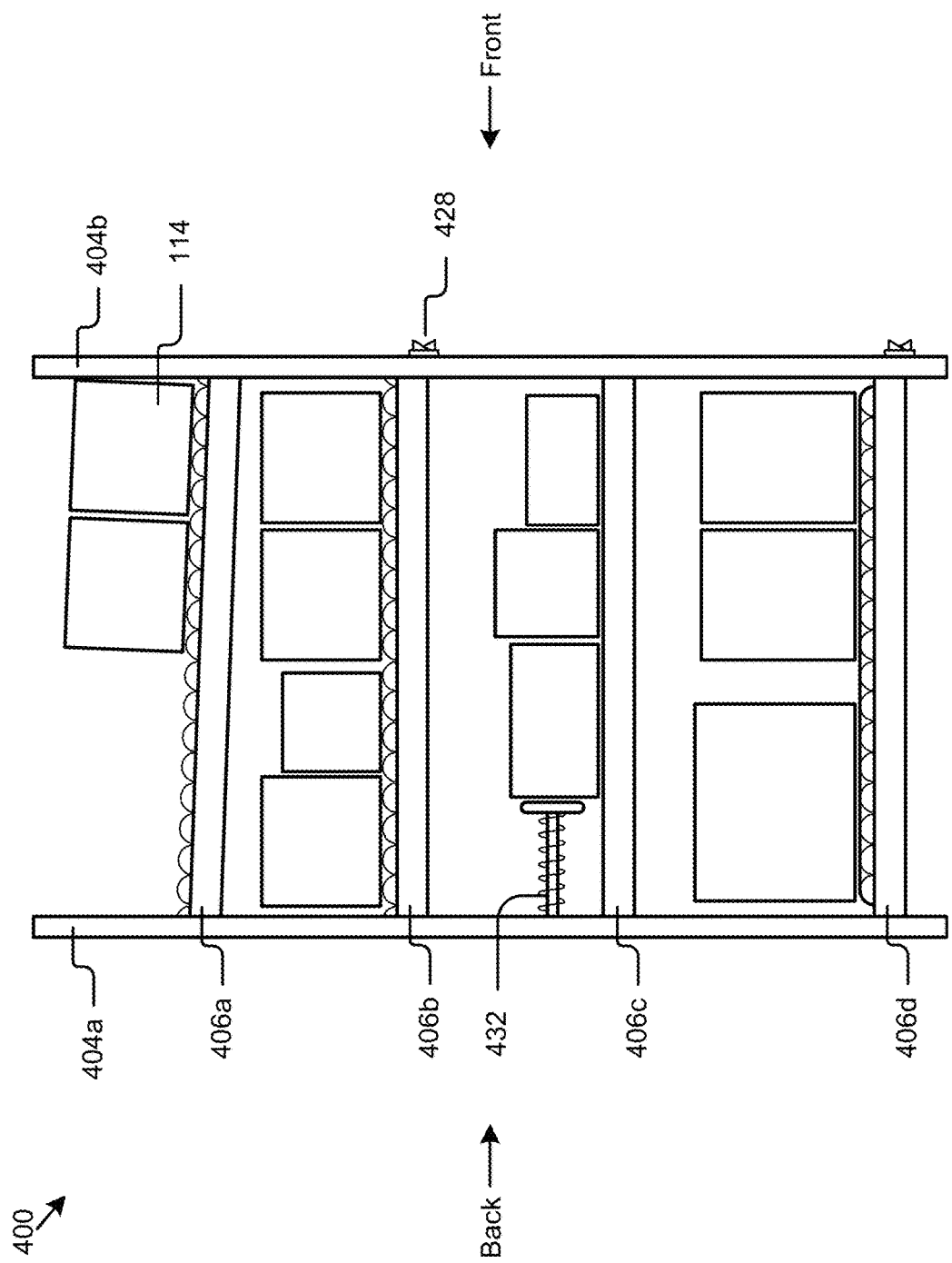
FIG. 4 is an illustration of an example shelving unit for use in a delivery vehicle with an automated guided vehicle.

It should be noted that, although scanning, adjusting, selecting, etc., are described in reference to the AGV shelves 214 in the AGV rack 206, the same processes and mechanisms may be used with the shelves 406 described in reference to FIG. 4, for example.

Figure 2D:
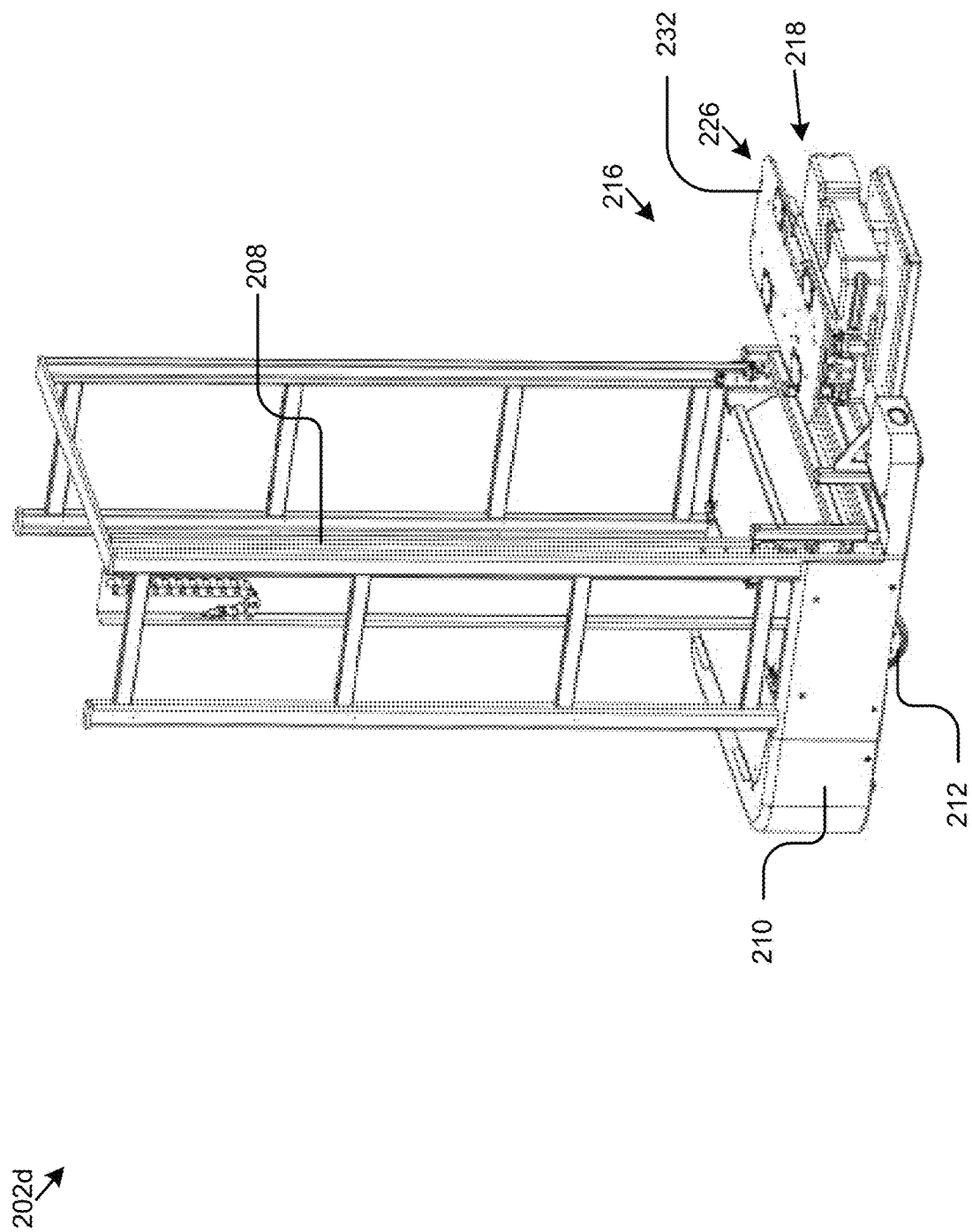
Figure 2E:
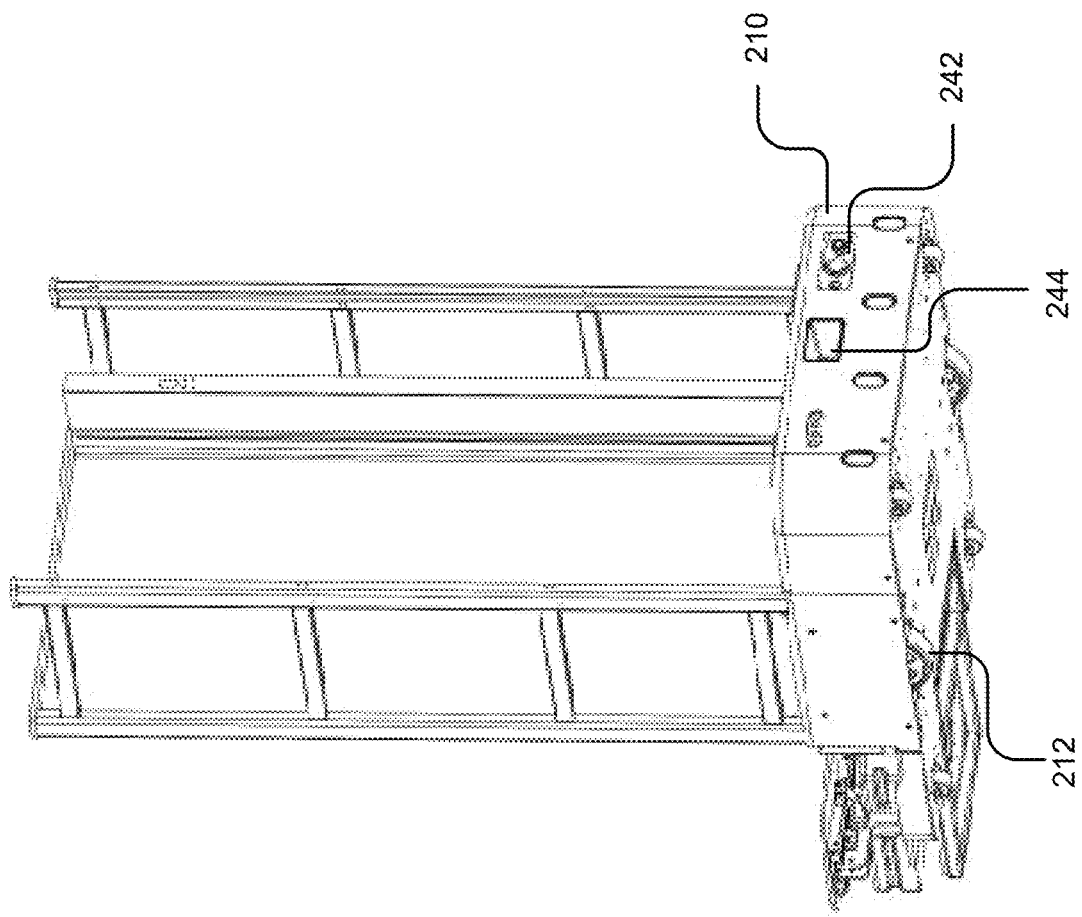

FIGS. 2D and 2E describe another example AGV 202*d* with an AGV body 210, drive unit 212, elevator 208, and IHM 216. The IHM 216 of the example AGV 202d may include a carrying device, platform 218, and carrying surface 232. The example AGV 202d may be used outside of the delivery vehicle 104 to bring items to the delivery vehicle 104 or transport items from the delivery vehicle 104, may be used both inside and outside of the delivery vehicle 104, or used solely inside the delivery vehicle 104, for example. In some implementations, as illustrated in FIG. 2E, the AGV 202d may include a connection point 242 on the body 210 for one or more of a compressor, power, or electronic signal, as described above (e.g., the connection point 242 may be electronically coupled with a controller, IHM 216, drive unit 212, or other component of the AGV 202d). In some implementations, the AGV 202d may include an optical sensor 244 on the body 210, IHM 216, etc., which allows the AGV 202d to locate itself and/or an item, for example, using a surface of the delivery vehicle 104, a marker in an operating environment, and/or a label on an item.

FIG. 3 is an illustration 300 of an example stability mechanism for use with some implementations of AGVs 102 and delivery vehicles 104. Implementations of the stability mechanism may include, for instance, a coupling or guiding device, such as rails, tracks, hooks, cables, and/or other mechanisms for securing the AGV 102 to the delivery vehicle 104, either continuously or in response to a certain trigger. For instance, the AGV 102 may include a stability mechanism interface for interacting with a stability mechanism of the delivery vehicle 104, thereby securing the AGV 102 to the delivery vehicle 104. For example, the stability mechanism of delivery vehicle 104 may include a hook or French cleat half attached to a wall (or a shelving unit 402) to which a stability mechanism interface, such as a second hook, loop, ring, second French cleat half, may attach. The rails, hooks, cables, etc., may be on the floor, ceiling, and/or wall(s) of the delivery vehicle 104.

For example, the example stability mechanism illustrated in FIG. 3 may include a first rigid member 334 coupled with a wall 336 of the delivery vehicle 104. For instance, the wall 336 may be a front wall on the interior of the storage area 124 of the delivery vehicle 104, although other implementations are possible. The first rigid member 334 may represent a rail, hook, or French cleat half, for example, that is coupled with the wall 336.

The example stability mechanism interface illustrated in FIG. 3 may include a second rigid member 328 coupled with a moveable component 316 of an AGV 102. The second rigid member 328 may represent a rail, hook, or French cleat half, for example, that may connect with the first rigid member 334. For instance, the second rigid member 328 may be coupled with a movable component 316, such as a carrying device 226, a platform 218, or an elevator 208, and the moveable component 316 may move the second rigid member 328 until it couples with the first rigid member 334 to secure the AGV 102, for example, as described elsewhere herein.

In some implementations, once the AGV 102 has finished loading the items into the delivery vehicle 104, the AGV 102 may use the stability mechanism interface to secure itself to the delivery vehicle, so that when the delivery vehicle moves, the AGV 102 does not tip, slide, roll, etc., around the interior of the delivery vehicle 104.

In some implementations, the AGV 102 may use location, acceleration, velocity, or delivery vehicle 104 information, for example, in combination with certain triggers to actively secure itself to the delivery vehicle 104. For instance, the AGV 102 may receive data from the delivery vehicle 104 indicating that the delivery vehicle 104 has started, is moving at a given velocity, has entered a freeway onramp, etc., in response to which the AGV 102 (or the delivery vehicle 104, depending on the implementation) may use a stability mechanism to prevent unintentional movement of the AGV 102 and/or items that the AGV 102 may be carrying (e.g., by lowering a carrying device 226, tightening a grip by the carrying device 226 on the item, etc.).

FIG. 4 is an illustration of a cross section an example shelving unit 402, which may be used in a delivery vehicle 104 and with an AGV 102. In some implementations, the shelving unit 402 may include one or more support members 404a . . . 404b, such as poles, beams, planks, etc., which are attached to and provide support to shelves 406. In some implementations, the shelving unit 402 may include several shelves 406a . . . 406d vertically arranged on the support members 404 in order to create a plurality of levels of the shelving unit 402 from which items can be stored or retrieved by an AGV 102. In some implementations, the shelves 406 may be supported by a wall of the delivery vehicle 104 in place of or in addition to the support member(s) 404.

It should be noted that the shelving unit 402 in FIG. 4 is illustrated as a two dimensional cross section from a side of the shelving unit 402 and the depth, width, height, etc., of the shelving unit 402 can be adjusted based on the size and shape of the delivery vehicle 104, items, or other design constraints. Although the item is illustrated in FIG. 4 as a carton 114, it should be understood that an item may be any physical object. The example features, components, numbers of components, and configuration of the shelving unit 402 shown and described in reference to FIG. 4 are provided by way of example and should not be construed as limiting as other implementations are possible and contemplated in this description.

In some implementations, a shelf 406, portion of a shelf 406, shelving unit 402, etc., may include a marker (not shown) identifying the shelf 406. For instance, a section of a particular shelf 406 may include a label on the front of the shelf 406. As described above, an AGV 102 may include a scanner coupled with the carrying device 226, platform 218, etc., that can read signatures or markers to identify the shelf and/or determine its location. For example, the scanner may be an optical scanner configured to read visual identifiers (e.g., labels including a QR code, bar code, etc.) to determine with which shelf 406 the carrying device 226 is aligned.

In some implementations, the shelves 406 may include dividers that prevent items from sliding across the shelf 406 (e.g., from side to side). For instance, a divider may include a partition running between a back side and a front side of a shelf 406 such that an item resting on the shelf 406 would contact the partition rather than slide across the shelf 406. A section of a shelf 406 may be separated from other parts of the shelf 406 by partitions and be individually identifiable by the AGV 102 or identified in a database 820. In some instances, various sections may have various widths, depths, or heights, thereby accommodating different sized items. The size of the sections of the shelves 406 may be used when sorting items to various locations in the delivery vehicle 104, for example, in the sorting method described in reference to FIG. 6.

The shelves 406 in the shelving unit 402 may be level or sloped and may, in some implementations, include features for facilitating movement of items across the shelf 406, such as an item displacement mechanism. For example, an item displacement mechanism of a shelf 406 may include rollers (e.g., as illustrated in the example shelves 406a, or 406b), a conveyor belt (e.g., as illustrated in the example shelf 406d), or a smooth top surface (e.g., as illustrated in the example shelf 406c) for facilitating movement of items between the front and the back of the shelf 406. It should be noted that these features are described by way of example and not limitation and that other implementations are possible and contemplated herein.

In some implementations, one or more of the shelves 406 may be partial. A partial shelf 406 may extend only partially underneath an item or have one or more indents, gaps, or channels, so that a carrying device 226 may more easily fit under the item to lift the item from the partial shelf 406.

In some implementations, the shelves 406, shelving unit 402, and or item displacement mechanism may include active or passive features for moving items within the shelving unit 402 to allow multiple items deep to be stored on and retrieved from a shelf 406. For example, a passive feature of a shelf 406 may be that the shelf 406 is sloped to cause items to slide to the front of the shelf 406 (e.g., as illustrated in the example shelf 406a). However, because roads or parking lots may be uneven and a delivery vehicle 104 in motion may experience variable external forces (e.g., due to acceleration, braking, turning, etc.), other mechanisms may be used in addition or in place of sloping the shelf 406. For instance, an active feature of the shelving unit 402 may apply a force to an item(s) on a shelf 406 to move the item. It should be noted that a shelf 406 may have zero or multiple features for moving items, for example, a shelf 406 may have both active and passive features for moving items.

For example, in some implementations, a shelf 406 may be sloped toward a front of the shelving unit 402, where items may be loaded into the shelving unit 402 (e.g., by an AGV 102), such as is illustrated at shelf 406a. For example, the slope of the shelf 406a may be such that an item with a given coefficient of friction may slide from a back side (e.g., proximate to a wall of a delivery vehicle 104) to a front side (e.g., proximate to a loading side, AGV 102, or aisle 120 of the delivery vehicle 104) using the force of gravity. In some implementations, a top surface of a shelf 406 may be constructed of a material, such as metal or plastic, and/or have a coating (e.g., Teflon®, graphite, etc.) such that a coefficient of friction of the top surface in combination with the angle of the slope allows items to slide to the front of the shelving unit 402 using the force of gravity. In some implementations, the angle of the slope may be increased (e.g., to be steeper) to accommodate for a tilt of the delivery vehicle 104 on an uneven road or parking lot.

In some implementations, a shelf 406 (e.g., as in example shelves 406a and 406b) may include rollers to facilitate movement of an item passively due to a slope, such as that of example shelf 406a, and/or actively, due to application of a force (e.g., as described below). It should be noted that, in order to conform to shapes of delivery vehicles 104, limitations in IHM 216 articulation constraints, various sized or shaped items, etc., some implementations of shelves 406 may be level or even slope downward away from the front of the shelving unit 402 (e.g., opposite to that shown in shelf 406a in FIG. 4). Similarly, the spacing of the shelves 406 may be variable to accommodate various sized items on different shelves 406, which may be used in assigning items to locations in the shelves 406 as described in further detail below in reference to FIG. 6.

In some implementations, a shelf 406 may have a non-powered item displacement mechanism, such as a spring 432 that pushes or pulls items between the back and the front of the shelf 406. For example, a spring (e.g., metal, pneumatic, etc.) or similar mechanism may be built into the shelf 406, rollers (e.g., a roller could be spring loaded), a conveyor belt, the shelving unit 402 itself, or the delivery vehicle 104 adjacent to the shelf 406. For example, a spring 432 could be compressed (or stretched) when items are placed on a shelf 406, thereby keeping items at the front of a shelf 406 (e.g., as with the items on shelf 406c). In some implementations, a mechanism, similar to the example spring 432 may be powered using a motor, linear motor, pneumatic chamber, etc., which may be used to push or pull items on the shelf.

In some implementations, an item displacement mechanism on a shelf 406 or shelving unit 402 may include a motor that drives rollers, a conveyor, or other pushing or pulling mechanisms (e.g., a linear motor, auger, worm gear, spiral coil, chain assembly, etc.) in order to move items across the shelf 406, although other mechanisms, such as pneumatic chambers, may be used. A powered item displacement mechanism may be include a power source, for example, provided by the delivery vehicle 104, AGV 102, or a battery coupled with the shelves 406.

In some implementations, the AGV 102 may include an electrical contact on an IHM 216, platform 218, carrying device 226, body, etc., that may connect with a corresponding contact on a shelf 406 or shelving unit 402 thereby powering a motor of an item displacement mechanism. In some instances, a shelf 406 or shelving unit 402 may include multiple item displacement mechanisms and the specific placement of the electrical contacts or a signal transmitted by the AGV 102 (or another component of the loading coordination system 800 wirelessly and/or via the electrical contacts) may specify which item displacement mechanism to activate and therefore which item(s) to move on the shelf 406.

In some implementations, the item displacement mechanism may include a mechanical coupling input device 428 for receiving a mechanical force (e.g., torque), which may cause the item displacement mechanism to move items on a shelf 406. The mechanical force may be received via a corresponding mechanical coupling output device of an AGV 102 or delivery vehicle 104. For instance, the AGV 102 may include a motor driving a mechanical coupling output device, which in turn drives a mechanical coupling input device of a shelf 406. A mechanical coupling input device 428 or output device may include a clutch plate, pinion, cogwheel, or other gear or mechanism for transferring force between a supplying device and the item displacement mechanism. For example, the AGV 102 may include a corresponding mechanical coupling output device for interacting with a mechanical coupling input device 428 of an item displacement mechanism. The mechanical coupling output device may be attached to an IHM 216, platform 218, carrying device 226, body 210, etc.

In some implementations, the mechanical coupling (e.g., the input and output devices) may turn a roller, conveyor, or other pushing or pulling mechanisms, as discussed above. As an illustrative example of using the mechanical coupling, an AGV 102 may lift a carrying device 226 to a shelf 406, extend the mechanical coupling output device until the mechanical coupling output device is matched to the mechanical coupling input device 428. The AGV 102 may turn or otherwise apply force to the mechanical coupling, which is mechanically coupled with the item displacement mechanism to move the item backward or forward on the shelf 406.

Figure 5:
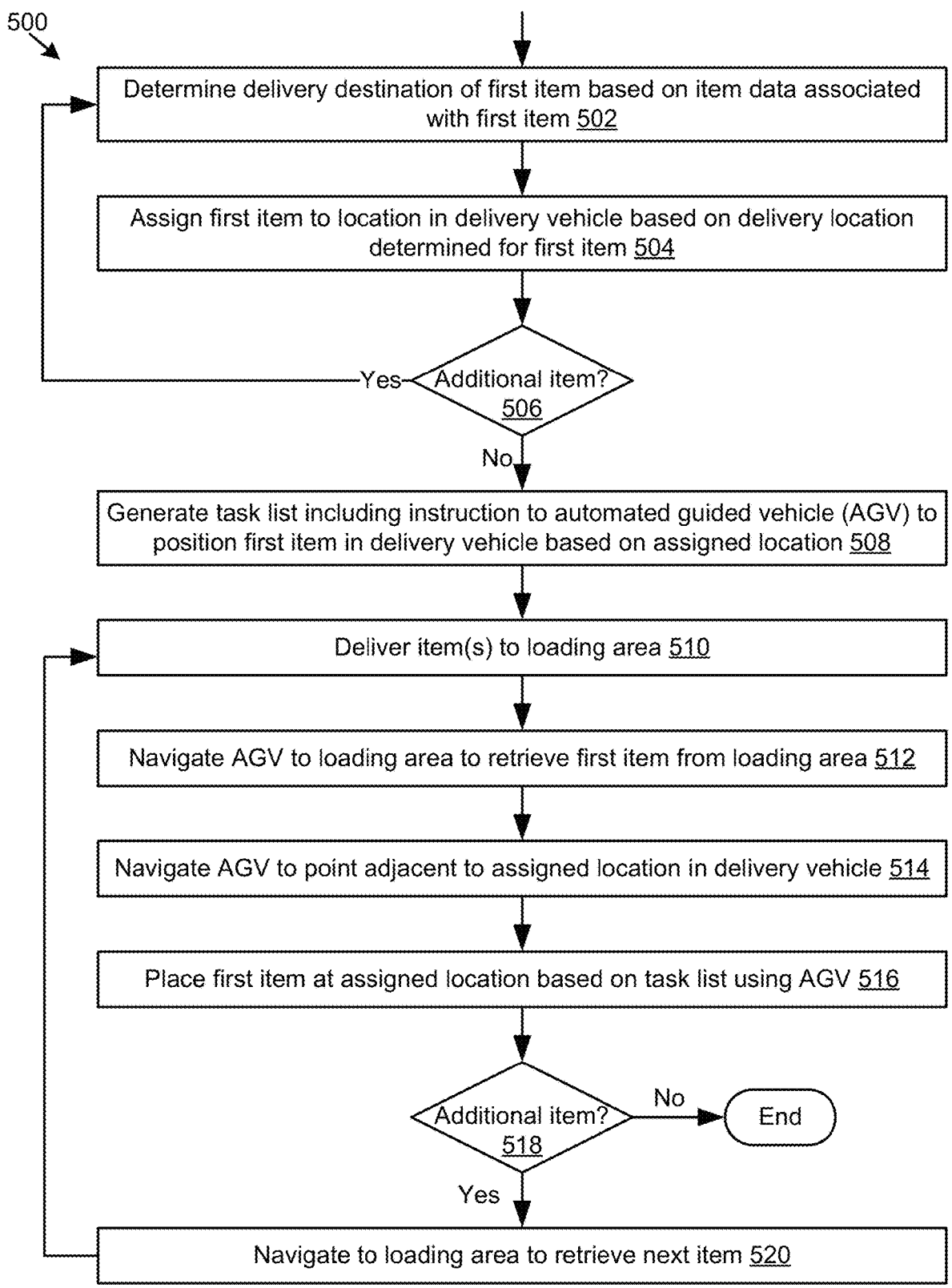
FIG. 5 is a flowchart of an example method for automated loading of delivery vehicles using automated guided vehicles.

FIG. 5 is a flowchart of an example method 500 for automated loading of delivery vehicles 104 using an AGV 102. As discussed in reference to FIG. 8, a loading coordination system may include computing systems associated with a cloud server, AGV 102, delivery vehicle 104, conveyor mechanism 108, or warehouse, etc. A set of items may be inducted into the loading-coordination system in response to receiving item data identifying attributes of the set of items. An order received by the loading coordination engine 804 may include one or more items, a delivery address, delivery or profile attributes, or other information. The loading coordination engine 804 may assign items and/or orders to a delivery vehicle 104 or door dock 110 associated with the delivery vehicle 104 based on delivery destinations of the items, current or projected load of delivery vehicles 104, etc. The loading coordination engine 804 may instruct a conveyor mechanism 108 to transport the item to the delivery vehicle 104, door dock 110, or loading area, and may instruct an AGV 102 to retrieve the item from the loading area and place it in a designated location in the delivery vehicle 104.

In some implementations, the loading coordination engine 804 may transmit a signal(s) identifying items, item attributes, loading areas, delivery vehicles 104, designated locations in delivery vehicles 104, etc., to one or more conveyor mechanisms 108, delivery vehicles 104, or AGVs 102. Other information such as identification of a loading area, location in a delivery vehicle 104, time window for the items to be at designated locations, routing directions, priority, traffic of other AGVs 102, item dimensions, etc., may also be transmitted in the signal to the components of the loading coordination system 800.

At 502, the loading coordination engine 804 may determine a delivery destination of a first item based on item data associated with the first item. In some implementations, the loading coordination engine 804 may receive order information identifying the item and the delivery destination, for example, as received from an e-commerce system, a warehouse system identifying outgoing items/orders, etc.

In some implementations, a scanner or other device communicatively coupled with the loading coordination engine 804 may scan or otherwise capture the item, or label attached to the item, as the item is picked up by an AGV 102 (e.g., AGV 102a or 102b in FIG. 1), as the item passes a point on a conveyor mechanism 108 bringing the item from a warehouse or store to the loading bay 106, or when scanned by a computing device of a human worker. For example, a scanner coupled with the conveyor mechanism 108 and communicatively coupled with the loading coordination engine 804 may scan a label attached to an item as it passes on the conveyor mechanism, and the loading coordination engine 804 may assign the item to a door dock 110, delivery vehicle 104, and/or designated location in the delivery vehicle 104 (e.g., as described in reference to FIG. 6). For instance, a conveyor mechanism 108 may bring the item to the appropriate door dock 110 in the loading bay 106 based on the scanned label.

At 504, the loading coordination engine 804 may assign the first item to a location in a delivery vehicle 104. The assignment to the location may be based upon the delivery destination of the item, the door of the delivery vehicle 104 to be used (e.g., as identified in the order or item data), dimensions of the item, weight of the item, dimensions of available spaces in the delivery vehicle 104, or other factors, as described elsewhere herein.

In some implementations, items are assigned to locations in the delivery vehicle 104 based on the order in which they are received by the AGV 102. For example, the AGV 102 may place items received at the back of shelves 406 beginning at the front of the delivery vehicle 104 and moving toward the back of the delivery vehicle 104. An example method for assigning items to locations in the delivery vehicle 104 is described in reference to FIG. 6.

In some implementations, at 506, the loading coordination engine 804 may determine whether there is an additional item assigned to the delivery vehicle 104. In response to determining that there is an additional item, the loading coordination engine 804 may determine the delivery destination of the next item and assign the next item to a location in the delivery vehicle 104 by iterating the operations at 502 and 504. In response to determining that there is not (or not yet, as described below) an additional item assigned do the delivery vehicle 104, the method 500 may continue to 506, for example. It should be noted that the operation 506 may occur in another order in the method 500 or be omitted, depending on the implementation.

At 508, the loading coordination engine 804 may generate a task list including an instruction to an AGV 102 to position the first item in the delivery vehicle 104 based on the assigned location in the delivery vehicle 104. The task list may include one or more tasks identifying one or more items to retrieve, transport, and/or place at a designated location in a delivery vehicle 104. The task list may include tasks for the placing a current item and/or a series of items in the delivery vehicle 104. In some implementations, the task list may be specific to each component of the loading coordination system (e.g., an AGV 102, a delivery vehicle 104, or a conveyor mechanism 108) or may include tasks for multiple components (e.g., AGV 102a and 102b).

In some implementations, the task list may include a defined route of an AGV 102 in the loading bay 106 and/or the delivery vehicle 104. The task list may additionally or alternatively identify movements of an IHM 216 of the AGV 102, for example, as described in reference to FIG. 7. The task list may, in some instances, include a schedule indicating when to retrieve items, place items at designated locations, lock into place using a stability mechanism in the delivery vehicle 104, or perform other operations.

At 510, the loading coordination engine 804 may instruct a component of the loading coordination system 800 to deliver the first item to a loading area associated with the delivery vehicle 104. For instance, the loading coordination engine 804 may issue an instruction to a conveyor mechanism 108, AGV 102, or a warehouse sorting mechanism. For example, an outbound warehouse system (which may include a human worker, AGV 102, conveyor mechanism(s) 108, etc.) may place an item on a conveyor mechanism 108 or AGV 102 that may bring the item to the loading area associated with the delivery vehicle 104. In some implementations, a conveyor mechanism 108 may include sorting mechanisms associated with door docks 110, which may be used to transport items to the specific door docks 110.

In some implementations, the loading coordination engine 804 may transmit instructions to a conveyor mechanism 108, an AGV 102, or a computing device of a human worker, which instructions may indicate to transport a particular item to a given location (e.g., a particular door dock 110, loading area, AGV 102, etc.) at a defined time or in response to a defined trigger (e.g., an item arriving at a defined location on the conveyor mechanism 108, the AGV 102 arriving at the loading area, etc.).

At 512, the loading coordination engine 804 may navigate the AGV 102 to a loading area to retrieve the first item from the loading area, which may be located inside or adjacent to the delivery vehicle 104 or otherwise in the loading bay 106. In some implementations, the AGV 102 may follow a track, series of guidance system markers (e.g., QR codes on the ground), etc., to navigate between its current location and the loading area. For example, a guidance system of the AGV 102 may read navigation markers and follow them until a destination defined by the loading coordination engine 804 is reached. In some instances, the AGV 102 may stop adjacent to the location in order for the IHM 216 of the carrying device 226 to lift the item from the loading area.

In some implementations, an AGV 102 may be fed by a conveyor mechanism 108, human worker, or another AGV 102 (e.g., as in AGV 102*b* feeding AGV 102*a*, as illustrated in FIG. 1), etc. For example, the loading coordination engine 804 may instruct an AGV 102 to retrieve an item from a loading area at the end of a conveyor mechanism 108 at a given time or in response to a defined trigger (e.g., an item passing a given point on a conveyor belt, reaching the end of a conveyor belt, etc.). In some instances, the loading coordination engine 804 may instruct the first AGV 102 to wait at the loading area for a conveyor mechanism 108, human worker, or a second AGV 102 to place the item on a carrying device 226 of the first AGV 102 or otherwise at the loading area.

At 514, the loading coordination engine 804 may navigate a point proximate to the assigned location in the delivery vehicle 104. For instance, after retrieving the item from the loading area, the AGV 102 may transport the item to the assigned location. For example, the AGV 102 may navigate to a point/location adjacent to the assigned location of the item such that the IHM 216 of the AGV 102 may place the item at the assigned location (e.g., directly or using an item displacement mechanism of a shelf 406). For example, a point proximate to the assigned location may be a position that is within the range of movement of the IHM 216 to place the item at the assigned location or on the shelf 406 where the assigned location is found. The proximate point may be at a defined offset to the assigned location of the item or to a shelf 406 on which the assigned location is found, for example, based on the range of motion of the IHM 216.

In some implementations, the autonomous navigation may be performed according to routing instructions in the task list. In some instances, the task list may include the assigned location of the item and the AGV 102 may automatically navigate, for example, by following the guidance system markers to the assigned location. In some implementations, the loading coordination engine 804 may define the details of the navigation, such as the guidance system markers, directions, movements, etc., of the AGV 102, and provide the details to the AGV 102.

In some implementations, such as where the AGV 102 is mounted to a track or rail in the delivery vehicle 104, the AGV 102 may navigate to a position longitudinally along the track or rail to be adjacent to the assigned location of the item.

At 516, the loading coordination engine 804 may place, by the AGV 102, the first item at the assigned location based on the task list. In some implementations, an AGV 102 may automatically put the item in the delivery vehicle 104. For example, the AGV 102 may automatically put an item on a shelf 406 in the delivery vehicle 104. In some implementations, the AGV 102 may place the item at an assigned location and/or in a defined sequence, for example, as determined in the example method described in reference to FIG. 6. In some implementations, the AGV 102 may articulate an IHM 216 to put the item on the shelf 406, for example, as described in the example method of FIG. 7.

In some implementations, at 518, the loading coordination engine 804 may determine whether there is an additional item to be placed in the delivery vehicle 104 (e.g., based on the task list). In response to determining that there is an additional item, the loading coordination engine 804 may continue to operation 520 where the AGV 102 navigates to the loading area to retrieve the next item and then iterates from the operation at 510. In response to determining that there is not (or not yet, as described below) an additional item to be loaded into the delivery vehicle 104 (e.g., based on the task list or a presence of the next item at the loading area), the method 500 may terminate, for example.

In some implementations, in response to a final item being placed in the delivery vehicle 104 (e.g., based on the task list, based on the delivery vehicle 104 being full, based on a signal from the loading coordination engine 804, etc.), the AGV 102 may secure itself (or the delivery vehicle 104 may secure the AGV 102) in the delivery vehicle 104, for example, using the stability mechanism described above). In some implementations, the AGV 102 and a computing system of the delivery vehicle 104 are communicatively coupled (e.g., directly or via the loading coordination server 802) and the delivery vehicle 104 may signal the AGV 102 to secure itself using the security mechanism. For example, the delivery vehicle 104 may transmit the signal to the AGV 102 in response to a trigger, such as the doors on the delivery vehicle 104 being closed, the delivery vehicle 104 shifting into drive, the delivery vehicle 104 starting, a threshold acceleration of the delivery vehicle 104, or another defined trigger.

In some implementations, the first item scheduled for delivery (e.g., in the sequence of deliveries for the delivery vehicle 104) may be automatically assigned to the carrying device 226 of the AGV 102 such that the item remains on the carrying device 226 until delivery. In some instances, at or before the delivery of the first item, the AGV 102 may transport the item to an appropriate door for the delivery (e.g., a back, front, side, or top door, as described above). In some implementations, the AGV 102 may automatically retrieve each item in the sequence of deliveries and transport them to a delivery door during delivery. In some instances, the AGV 102 may shuffle items in the delivery vehicle 104 in order to retrieve the next item in a sequence of deliveries.

It should be noted that the method 500 described in reference to FIG. 5 is provided by way of reference and that the method 500 may be performed with additional or fewer steps or features.

Figure 6:
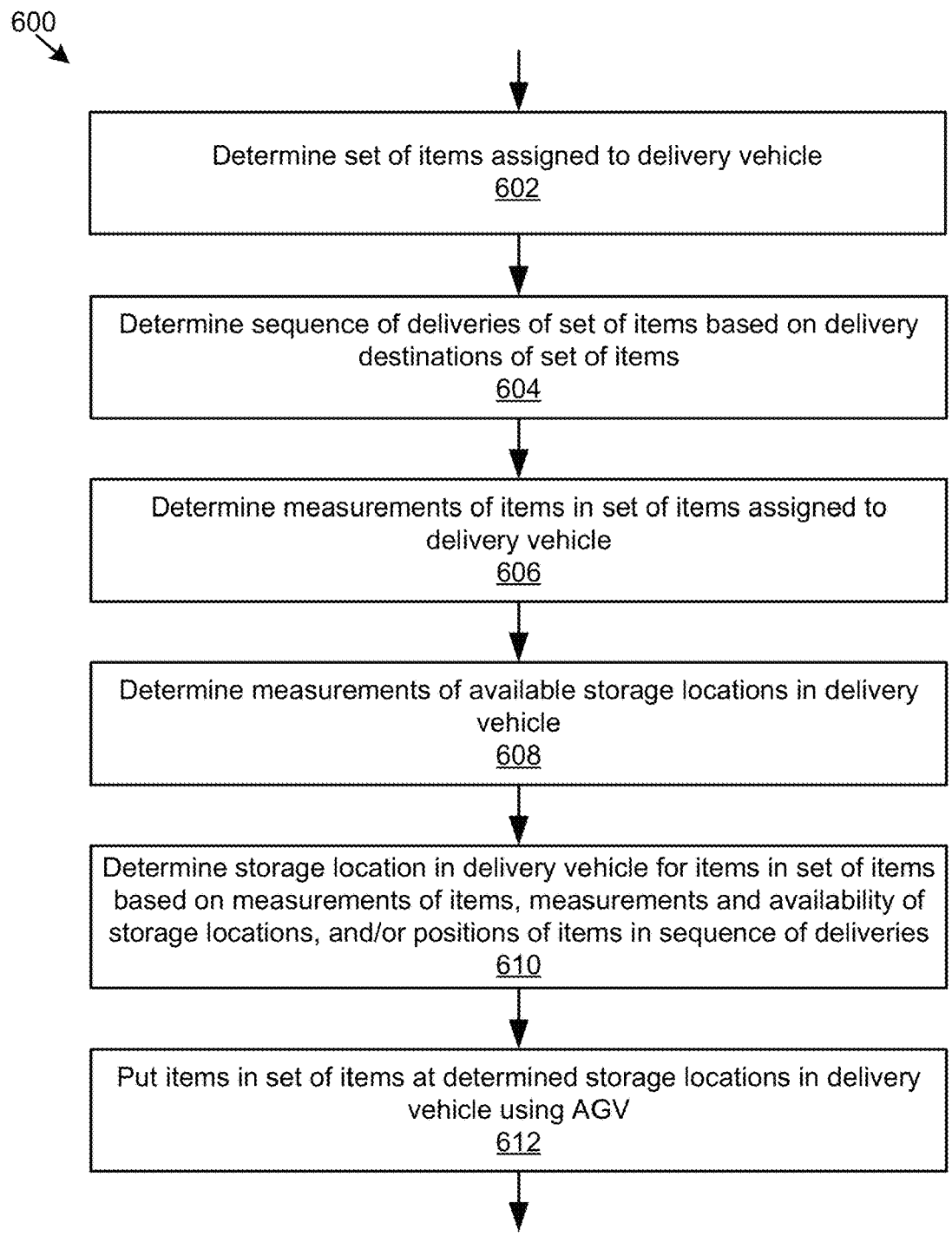
FIG. 6 is a flowchart of an example method for sorting items loaded by an automated guided vehicle.

FIG. 6 is a flowchart of an example method 600 for sorting items to be loaded by an AGV 102 into a delivery vehicle 104. The method 600 may describe an inventory sorting algorithm to optimize the outbound process, for example, the AGV 102 may logically shuffle or arrange orders to prepare the delivery vehicle 104, for example, for a sequence of deliveries.

At 602, the loading coordination engine 804 may determine a set of items assigned to a delivery vehicle 104. For example, a delivery vehicle 104 may have a given capacity, may deliver to a defined geographic area, or may have otherwise have certain orders and/or items assigned to the delivery vehicle 104. For instance, a delivery vehicle 104 may have a geographic area assigned to it and the loading coordination engine 804 may assign all orders with delivery destinations in that geographic area to the delivery vehicle 104. In some instances, assignment of the items to delivery vehicles 104 may occur as items are delivered to the loading area (e.g., by the conveyor mechanism 108, as described above).

In some implementations, at 604, the loading coordination engine 804 may determine a sequence of deliveries of the set of items assigned to the delivery vehicle 104 based on delivery destinations of the set of items. For example, each item in the set of items may be associated with a delivery destination, which may be a geographic location. The sequence of deliveries may be determined based on a route through the delivery destinations. For instance, a mapping application may determine a route mapped through the delivery destinations of the set of items. In some implementations, the loading coordination engine 804 may determine a position in the sequence of deliveries for a delivery of a particular item assigned to the delivery vehicle 104.

It should be noted that an order may have one or more items (e.g., multiple boxes, multiple products, etc.) and a given delivery destination may have one or more orders. When a delivery destination has multiple items, the items at that destination may be sequenced based on the order to which they belong, the size or type of the items, arbitrarily, or the items may have occupy the same position in the sequence.

At 606, the loading coordination engine 804 may determine measurements of items in the set of items assigned to the delivery vehicle 104. In some implementations, the measurements may be stored in item data that may be determined based on scanning or otherwise capturing a label of the item, for example. For example, the loading coordination engine 804 may look up item or order data pertaining to the item in a database 820, where the dimensions and other attributes of the item may be stored. In some implementations, the measurements may be automatically determined using an optical scanner.

If the dimensions of an item exceeds a defined threshold size or weight. For example, if the item is a pallet 126 (e.g., as illustrated in FIG. 1) of products or a particularly large or heavy item, the item may be automatically assigned to a pallet location in the delivery vehicle 104 or marked as exceeding a threshold dimension. Such an item may be automatically flagged by the loading coordination engine 804 to be manually loaded by a human worker or forklift, for example.

At 608, the loading coordination engine 804 may determine measurements of available storage locations in the delivery vehicle 104. For example, there may be a defined quantity and configuration of storage locations on shelves 406, pallets, or in other locations in the delivery vehicle 104. A storage location may have a defined weight capacity, height, width, etc. In some implementations, an available storage location may be a subdivision of a shelf 406 and may, for instance, have a variable size based on the quantity and size of items assigned to or already stored on the shelf 406. For example, an item with a particular depth (or other dimension) that is less than the amount of available space on a shelf 406 may be assigned to the shelf 406, thereby decreasing the remaining amount of available space on the shelf 406 to which an additional item may be assigned. For example, once the item is assigned to the available storage location, that storage location may be marked in a database as assigned to the item and the remaining available space on the shelf 406 may be recalculated and left in the database 820 for future assignment to another item.

In some implementations, the loading coordination engine 804 may cube the dimensions of the item and the available storage location in the delivery vehicle 104 to facilitate assignment of the items to delivery. Cubing the dimensions of an item or available space may include determining a cube having dimensions such that the item (e.g., for an irregularly shaped item) may fit in the cube or a cube that would fit in the available space.

In some implementations, delivery vehicles 104 may be different from one another. As such, in some instances, a loading coordination engine 804 may determine the number, size, location, and/or configuration of available storage locations in the delivery vehicle 104 to which items may be assigned. The loading coordination engine 804 may also determine, for a particular delivery vehicle 104, its available doors, interior dimensions, guidance system markers, etc., to use when assigning items and navigating the AGV 102 in the delivery vehicle 104. These and other attributes may be linked with the particular delivery vehicle 104 in delivery vehicle data 832 in an accessible database (e.g., the database 820 described in reference to FIG. 8) or transmitted by a computing system of the delivery vehicle 104 to the loading coordination engine 804 (e.g., on an AGV 102 and/or loading coordination server 802).

At 610, the loading coordination engine 804 may determine and/or assign storage locations in the delivery vehicle 104 for items in the set of items assigned to the delivery vehicle 104. For instance, the determination of the storage locations may be based on the measurements of the items, measurements and availability of storage locations in the delivery vehicle 104, and/or positions of the items in the sequence of deliveries for the delivery vehicle 104. In some implementations, items may be assigned to available locations in a database 820.

In some implementations, the loading coordination engine 804 may use for a door of the delivery vehicle 104 to be used at delivery to assign the item to a location in the delivery vehicle 104. For instance, a delivery destination may have a delivery door associated therewith, and items may be assigned to a location near the door with each item/delivery destination in the delivery vehicle 104. For example, at delivery, a rear door may be used with a door dock 110, a side door may be used for curbside delivery, a top door may be used with a delivery drone, etc. The loading coordination engine 804 may assign items near to the delivery door that will be used during delivery, so that items for a particular door may be near to the door, thereby reducing AGV 102 workload.

In some implementations, the loading coordination engine 804 may assign the items to available shelving locations based on the dimensions of the items and of the available shelving locations. In some instances, items of a given weight may be matched to a shelf 406 having a corresponding weight capacity range (e.g., a heavier duty and/or lower height shelf 406 may hold heavier items). In some instances, some shelves 406 may have a larger available space (e.g., the height above the shelf 406 may be larger) than other shelves 406 and items may be assigned according to their size. For example, an item may be assigned to the smallest shelf 406 that has sufficient size for that item (although other criteria may also be applied to store the item on a larger shelf 406).

In some implementations, the loading coordination engine 804 may assign items to available shelving locations based on the position of the delivery of each item in the sequence of deliveries. For example, the items may be assigned to depths or positions in a shelf 406 in a reverse order of the sequence of deliveries. For example, the last-delivered items may be assigned to the back (e.g., as illustrated in FIG. 4) of a shelf 406 first, such that a front-most item on a given shelf 406 would be retrieved from the shelf 406 by the AGV 102 at delivery before items behind it on the shelf 406 are retrieved during their respective deliveries.

In some implementations, the loading coordination engine 804 may use some, all, or different criteria to those described for sorting and assigning items to available locations. The methods for sorting and assigning may be performed in the order described or in another order. Further, it should be understood that other methods of sorting and assigning the items to locations in the delivery vehicle 104 may be used without departing from the scope of this disclosure and that other methods are possible and contemplated herein.

As an example, the items may be sorted into groups based on delivery door, the items in the groups may be sorted into sub-groups based on size class of the items, and the items in sub-group may be sorted in a reverse order of delivery to place first delivered items at the front of shelves 406 and later deliver items deeper in the shelves 406.

In some implementations, the items may be assigned one at a time to available locations in the delivery vehicle 104 using some, all, or different criteria than described above. For instance, items may be assigned one at a time if the sequence of deliveries or all items assigned to the delivery vehicle 104 are not yet known to the loading coordination engine 804 when assignment begins. For example, the loading coordination engine 804 may receive attributes of the item, such as the dimensions, delivery door, and delivery destination of the item, and, in response, the loading coordination engine 804 may assign the item to an available location in the delivery vehicle 104 and instruct the AGV 102 to place the item at the assigned location, as described below.

In some implementations, the loading coordination engine 804 may use the data of those items already assigned to the delivery vehicle 104 to assign subsequent items to locations in the delivery vehicle 104. For example, the loading coordination engine 804 may assign an item to the smallest available shelf 406 that would fit the item. The item may be assigned to a location in front of a previously assigned item with a later delivery based on the sequence of deliveries. The item may be assigned to a back of a new section of a shelving unit 402 if no item with a later delivery is assigned. If no available locations in front of items with later deliveries are available, the item may be assigned in front of a prior delivery and items may be automatically shuffled by the AGV 102 during delivery to retrieve the appropriate item for a delivery destination. In some implementations, the loading coordination engine 804 may assign items to available locations beginning near to the delivery door for the deliveries of the items and moving away from the delivery door, although other implementations are possible. It should be understood that other sorting criteria are also possible and contemplated herein. In some implementations, this, or a similar, process may be repeated for each new item assigned by the loading coordination engine 804.

At 612, the loading coordination engine 804 may put the items in the set of items at the determined storage locations in the delivery vehicle 104 using the AGV 102. For example, the loading coordination engine 804 may instruct an AGV 102 to transport the item to an assigned location and place the item at the assigned location. An example method for placing items at a location in the delivery vehicle 104 is described in reference to FIG. 7.

Figure 7:
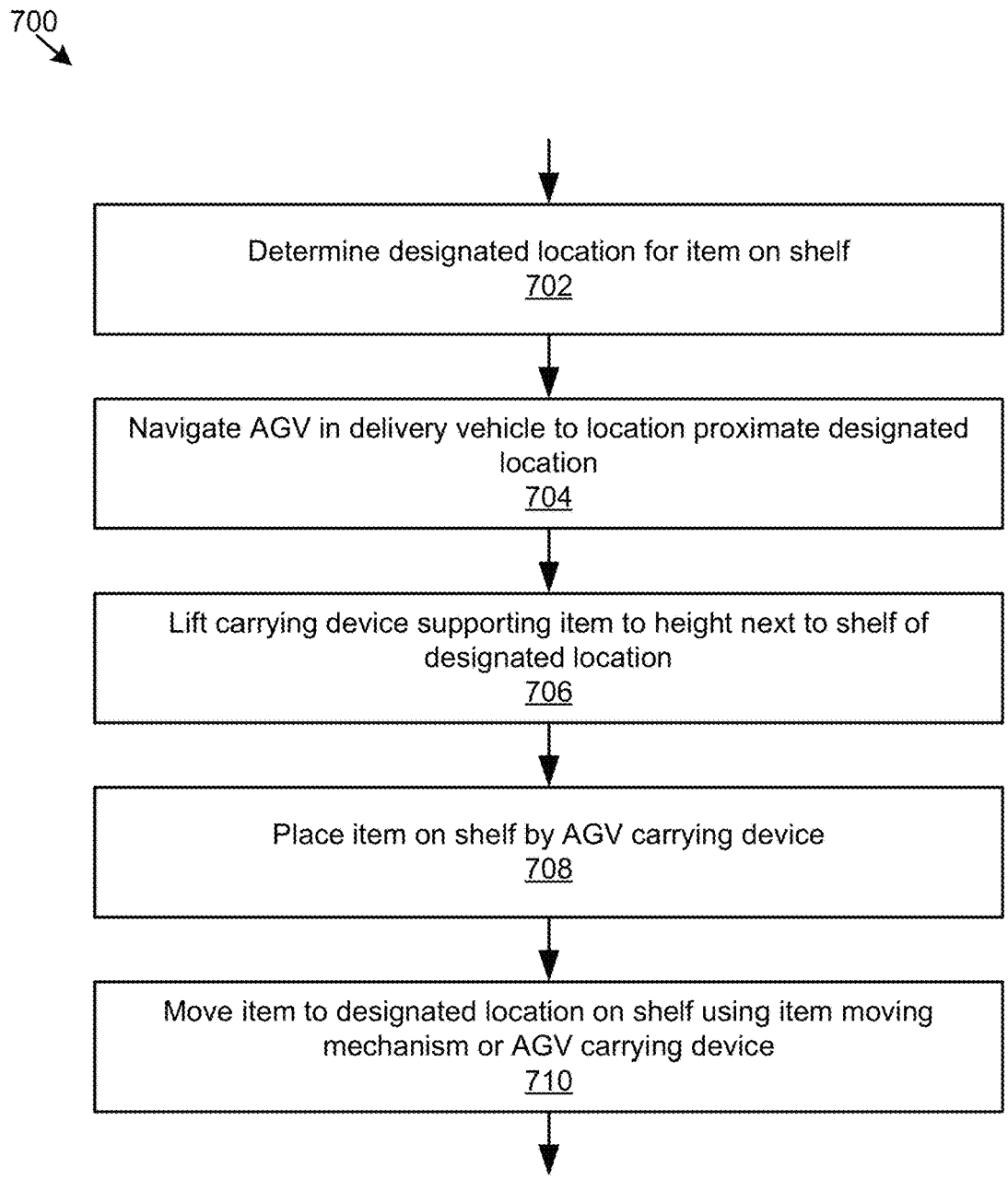
FIG. 7 is a flowchart of an example method for placing items on a shelf at a designated location by the AGV.

FIG. 7 is a flowchart of an example method 700 for placing items on a shelf 406 at a designated location by the AGV 102. The operations of the example method 700 are provided by way of example and other operations and mechanisms are possible and contemplated herein. In some instances, a loading coordination engine 804 or software on a controller of the AGV 102 may direct the AGV 102 to perform some or all of the operations of the method 700. Although not illustrated in FIG. 7, an item may be placed on an AGV 102 or retrieved by the AGV 102 from a loading area, as described in further detail above.

In some implementations, the method 700 may be triggered in response to an arrival of the delivery vehicle 104 at a loading bay 106. For instance, the computing system of the delivery vehicle 104 may transmit a signal to the loading coordination engine 804 on the loading coordination server 802 or AGV 102 indicating arrival of the delivery vehicle 104 and, in some instances, identification of the delivery vehicle 104.

At 702, the AGV 102 may determine a designated location assigned to an item on a shelf 406 in the delivery vehicle 104. In some implementations, the assigned location may be transmitted to the AGV 102 from a loading coordination engine 804, loading coordination server 802, delivery vehicle 104, etc. In some implementations, a scanner (e.g., optical, radio, etc., as described elsewhere herein) of the AGV 102 may scan a label on the item, which label may contain the assigned location or may refer to the database 820, which stores the assigned location of the item and which the AGV 102 may access to retrieve the assigned location (and, in some instances, other item attributes).

At 704, the AGV 102 may navigate in the delivery vehicle 104 to a location proximate to the designated location. For example, an AGV 102 may retrieve an item from a loading area, as described above, and then move down a length of an aisle 120 with shelving units 402 on one or both sides of the aisle 120 (e.g., as described and illustrated in FIG. 1) and then stop in front of a shelving unit 402 where the assigned location is located. In some instances, the AGV 102 may be positioned such that the left side or the right side of the AGV 102 faces a face of the assigned shelving unit 402 (e.g., at a section or position of the shelving unit 402 within the range of motion of the IHM 216).

In some implementations, the AGV 102 may navigate in an operating environment, such as a loading bay 106 and/or a delivery vehicle 104, to a location proximate to a shelving unit 402 to which the item is assigned. In some implementations, the AGV 102 may determine its location within the operating environment using a guidance system and navigate from a first location to a second location in the operating environment. As discussed in further detail above, the guidance system may include sensors that detect and process navigation indicators or markers to locate the AGV 102 as it traverses the operating environment. For example, the guidance system may include an optical scanner on a body of the AGV 102 that reads visual markers (e.g., QR codes) on a floor of the operating environment. In some implementations, the guidance system may include laser-based guidance systems, such as LIDAR (light imaging, detection, and ranging). A controller of the AGV 102 may look the visual marker up in an accessible database, such as the map data 822.

In some implementations, a controller of the AGV 102 may instruct the IHM 216, or a component thereof, to raise or lower the carrying device 226 vertically and, in some instances, move the carrying device 226 sideways relative to the direction of movement of the AGV 102 place the item on a shelf 406.

At 706, the IHM 216 may lift the carrying device 226, which in turn lifts the item vertically. The carrying device 226 may support the item directly by engaging with the item (e.g., sliding underneath the item, coupling to the sides or front of the item, etc.). For example, the AGV 102 may determine which storage shelf 406 on a particular shelving unit 402 to align a carrying device 226 with (based on control instructions and/or the assigned location received from the loading coordination engine 804) and may elevate the carrying device 226 to a height based on the height of the storage shelf 406. In some instances, the AGV 102 may raise the carrying device 226 toward the storage shelf 406 and stop once a scanner (e.g., coupled with the IHM 216 or carrying device 226) of the AGV 102 detects a shelf marker (e.g., a barcode, QR code, etc.). For example, the AGV 102 may use a unique identification code of the marker scanned from the marker compared to instructions received from the loading coordination engine 804 to identify the shelf 406, depending on the implementation.

In some implementations, the AGV 102 may use a shelf identifier or unique identification code in a database to determine a height of the shelf 406 and may adjust a height of the carrying device 226 along at least a third (e.g., a vertical) axis to place the item on the shelf 406. In some implementations, the AGV 102 may alternatively or additionally use placement of other items, markers, or structure of the shelving unit 402 to determine the coordinates at which to extend the carrying device 226 in order to place the item on the shelf 406.

At 708, the AGV 102 may place the item on the shelf 406 using the carrying device 226. In some implementations, the AGV 102 may extend the carrying device 226 toward the shelf 406. For example, the carrying device 226 may move toward the shelf 406 if the carrying device 226 is too far from the shelf 406 to slide the item off the carrying device 226 (e.g., using rollers on the carrying device 226) and directly onto the shelves 406.

In some implementations, the AGV 102 may move the carrying device 226 toward the shelf 406 to place an item on top of the shelf 406. For instance, the IHM 216 (e.g., using the elevator 208) may raise or lower the carrying device 226 to align it above a shelf 406 at the assigned location, and then extend the carrying device 226 toward the shelf 406 to set the item on the shelf 406. For example, the IHM 216 may raise the carrying device 226 along at least the third axis until the item is above a particular shelf 406. The IHM 216 may then lower the carrying device 226 along at least the third axis (e.g., the vertical or Y axis) to place the second item on the shelf 406. In some instances, the AGV 102 may disengage the carrying device 226 from the item once the item is resting on the shelf 406.

At 710, the AGV carrying device 226 or the shelving unit 402 (e.g., an item displacement mechanism, as discussed above) may move the item to the designated location on the shelf 406. In some implementations, the carrying device 226 may extend into the shelving unit 402 to push the item into the shelf 406 at the appropriate depth to be at the assigned location (or, for example, until the item hits the back of the shelf 406 or an item behind it on the shelf 406).

In some implementations, the carrying device 226 may place the item onto a shelf 406 at the front of the shelving unit 402 and the item displacement mechanism of the shelf 406 may move the item to the assigned location on the shelf 406 (e.g., to a defined depth, to the back of the shelf 406, until the item contacts an item behind it on the shelf 406, etc.). The AGV 102 (or the loading coordination engine 804) may actuate the item displacement mechanism to move the item by, for example, applying a torque to a mechanical coupling, applying a current to an electrical contact, or transmitting signal to the item displacement mechanism, for example, as described in detail in reference to FIG. 4.

In some implementations, upon placing the item on the shelf 406 at the assigned location, the loading coordination engine 804 may store an identifier of the item in association with an identifier of the assigned location and/or the shelf 406 in order to recall later where items are placed in the delivery vehicle 104. This may be useful, for example, if the AGV 102 shuffles items around to retrieve an item in the shelving unit 402.

It should be noted that the method 700 of FIG. 7 may have additional or fewer operations and may be performed with different components. Further, some or all of the operations may be repeated as appropriate and/or needed for any suitable number of items.

FIG. 8 is a block diagram of an example loading coordination system 800 and data communication flow for automated loading of delivery vehicles 104 using AGVs 102. The system 800 may include a loading coordination server 802, one or more AGVs 102, one or more delivery vehicles 104, a database 820, and/or warehouse equipment 810.

The components of the system 800 may be coupled to exchange data via wireless and/or wired data connections. The connections may be made via direct data connections and/or a computer network. The computer network may comprise any number of networks and/or types of networks, such as wide area networks, local area networks, virtual private networks, cellular networks, close or micro proximity networks (e.g., Bluetooth™ etc.), etc.

The loading coordination server 802 may, in some implementations, include one or more hardware and/or virtual servers programmed to perform the operations, acts, and/or functionality described herein. The components of the loading coordination server 802 may comprise software routines storable in one or more non-transitory memory devices and executable by one or more computer processors of the loading coordination server 802 to carry out the operations, acts, and/or functionality described herein. In further implementations, these routines, or a portion thereof, may be embodied in electrical hardware that is operable to carry out the operations, acts, and/or functionality described herein.

In some implementations, the loading coordination server 802, or elements thereof, may be integrated with or communicatively coupled with a plurality of AGVs 102. The loading coordination server 802 may include hardware and software configured to dispatch the AGVs 102, and is coupled for communication the other components of the system 800 to receive and provide data. In some instances, the loading coordination server 802 may calculate a route to execute tasks considering traffic and resources. In some cases it adjusts the route or the task in order to keep the route optimum. In some implementations, the loading coordination server 802 may generate a schedule that defines the route and other operations for an AGV 102, as described herein. For instance, the loading coordination server 802 may instruct an AGV 102 to navigate within a distribution facility, loading bay 106, or delivery vehicle 104 according to the schedule. The schedule of a plurality of the AGVs 102 may be coordinated such that an optimal flow can be achieved.

The loading coordination engine 804 may comprise software routines storable in one or more non-transitory memory devices and executable by one or more computer processors to carry out the operations, acts, and/or functionality described herein. In further implementations, these routines, or a portion thereof, may be embodied in electrical hardware that is operable to carry out the operations, acts, and/or functionality described herein. Instances of the loading coordination engine 804a . . . 804n may be executed by one or more of the components of the system 800. The loading coordination engine 804 may be operable on the loading coordination server 802 (or another component of the system 800) and communicatively coupled to receive data from and transmit data to other components of the system 800, as described elsewhere herein. In some implementations, the loading coordination engine 804 may be configured to store, retrieve, and/or maintain data in the database 820. In some implementations, the components, features, or functionality of the loading coordination engine 804 may be distributed among two or more components of the system 800, for example.

The database 820 is an information source for storing and providing access to data. The data stored by the database 820 may be organized and queried using various criteria including any type of data stored by it. The database 820 may include data tables, databases, or other organized collections of data. Examples of the types of data stored by the database 820 may include, but are not limited to map data 822, AGV data 828, location assignment data 824, order data 826, item data 830, vehicle data 832, etc. In some instances, the database 820 may also include conveyor system attributes, delivery destination attributes, sensor data, etc.

The database 820 may be included in the loading coordination server 802, or in another computing system and/or storage system distinct from but coupled to or accessible by components of the system 800 to store, retrieve, or maintain data in the database 820. In some implementations, the database 820 may be stored in a data store 908, as described in reference to FIG. 9. The database 820 can include one or more non-transitory computer-readable mediums for storing the data. In some implementations, the database 820 may store data associated with a database management system (DBMS) operable on a computing system. For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations.

The map data 822 may include data reflecting the 2 or 3 dimensional layout of zones, such as a facility, loading bay 106, and/or delivery vehicle 104, for example. In some instances, the map data 822 may include geographic map data, such as delivery areas and routes for delivery vehicles 104. The map data 822 may include data about guidance system markers, such as unique identification codes of the markers and positions of the markers in the layout of the facility, loading bay 106, or delivery vehicle 104.

The location assignment data 824 may include data representing available locations in a delivery vehicle 104 that may be assigned to items, such as what locations are available, the dimensions, capacities, 2 or 3 dimensional locations, etc., for example. The location assignment data may also include shelf 406 specific information, such as the height, width, depth, weight capacity, item handling mechanism, shelf identifier, or other information about shelves 406. In some instances, the location assignment data 824 may also include whether and which items are assigned to and/or currently stored in the locations in a particular delivery vehicle 104.

The order data 826 may include data about orders, the quantity and identity of items in orders, delivery destination (e.g., a shipping address) information for orders, customer account information, order priority, progress of order fulfillment, number of cartons in an order, etc.

The AGV data 828 may describe the state of an AGV 102 (operational state, health, location, battery life, storage capacity, items being carried, etc.), whether and to which delivery vehicle 104 it is assigned, etc.

Item data 830 may describe unique identifiers for items, the location of the items, other attributes of the item (e.g., size, description, weight, quantity of items in a package, color, etc.), item inventory, mapping of items to locations in delivery vehicles 104, item label or marker information, etc.

Vehicle data 832 may represent identification codes identifying specific delivery vehicles 104; routes, items, AGVs 102 associated with delivery vehicles 104, available locations, door docks 110, etc. In some implementations, the vehicle data 832 may include attributes of the delivery vehicle 104, such as its location, acceleration, number and configuration of doors, placement of stability mechanisms, number and configuration of shelves 406 or other storage locations in the delivery vehicle 104, etc.

An AGV 102a . . . 102n is an automated guided vehicle or robot that may be configured to autonomously transport items, as described in detail above. An AGV 102 may include a computing system (e.g., as in the example provided in FIG. 9) with communication and processing capabilities. For example, the AGV 102 may run the loading coordination engine 804 or a component thereof.

A delivery vehicle 104a . . . 104n may include a computing system that may communicate with other components of the loading coordination system 800 and may, in some instances, perform some operations described in reference to the loading coordination engine 804. For example, a computing system of a delivery vehicle 104 may include the loading coordination engine 804 or a component thereof. In some implementations, the computing system of the delivery vehicle 104 may transmit information to an AGV 102 associated with the delivery vehicle 104, as described above.

The loading coordination server 802 may be coupled with equipment 810, such as a conveyor mechanism 108 (e.g., conveyor controls, conveyor scanners, conveyors, automated induction equipment, other warehouse equipment, etc.), described herein.

Figure 9:
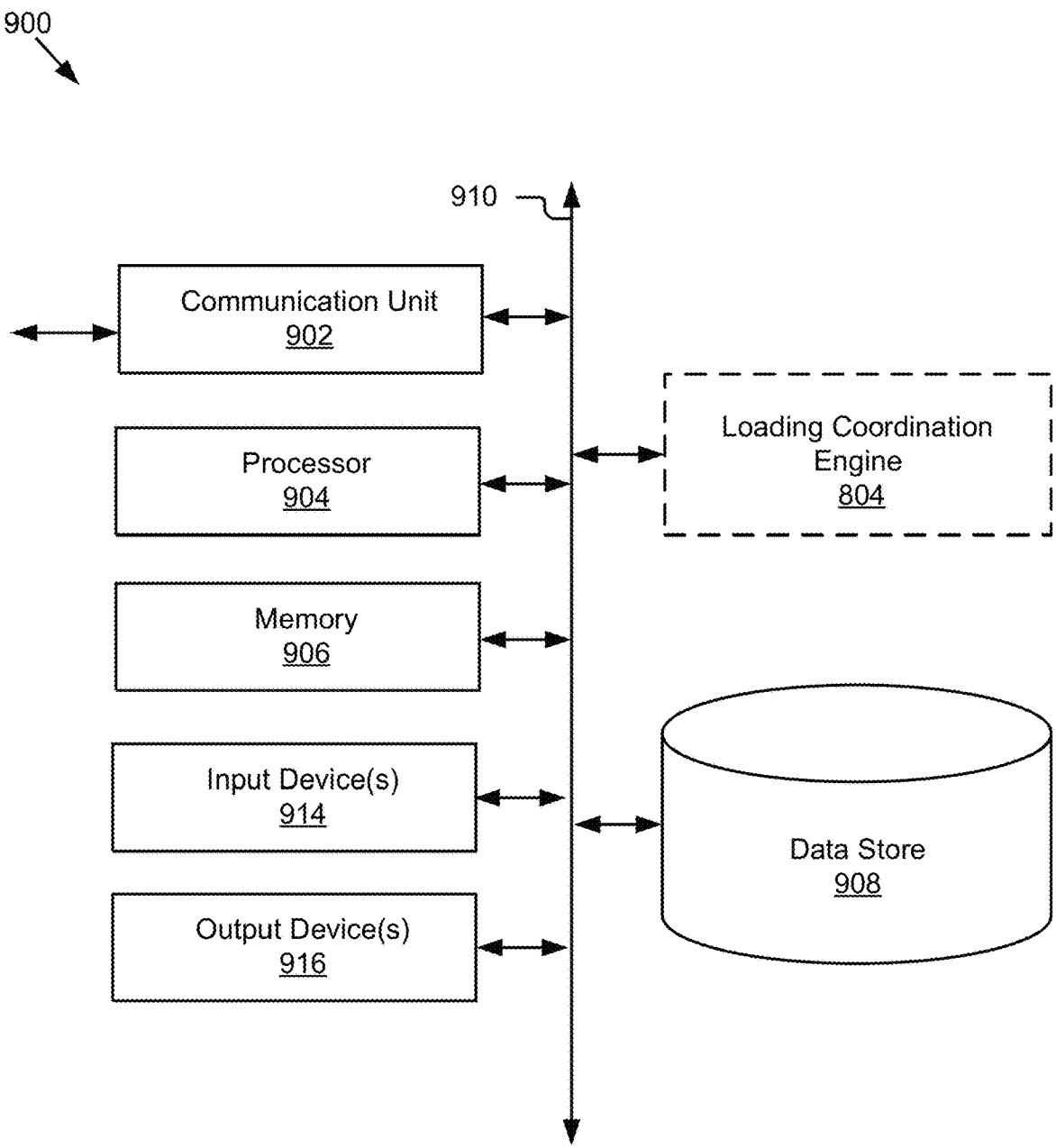
FIG. 9 is a block diagram of an example computing system.

FIG. 9 is a block diagram of an example computing system 900. This computing system 900 may represent the computer architecture of loading coordination server 802, AGV 102, delivery vehicle 104, or delivery vehicle 104, as depicted in FIG. 8, and may include different components depending on the implementation being represented.

As depicted in FIG. 9, the computing system 900 may include a loading coordination engine 804, depending on the configuration. In some implementations, the computing system 900 may store and/or operate other software that may be configured to interact with the loading coordination engine 804 via a communication unit 902.

The loading coordination engine 804 may include software including logic executable by the processor 904 to perform its respective operations described herein, although in further embodiments the loading coordination engine 804 may be implemented in hardware (one or more application specific integrated circuits (ASICs) coupled to the bus 910 for cooperation and communication with the other components of the system 900; sets of instructions stored in one or more discrete memory devices (e.g., a PROM, FPROM, ROM) that are coupled to the bus 910 for cooperation and communication with the other components of the system 900; a combination thereof; etc.).

As depicted, the computing system 900 may include a processor 904, a memory 906, a communication unit 902, an output device 916, an input device 914, and data store(s) 908, which may be communicatively coupled by a communication bus 910. The computing system 900 depicted in FIG. 9 is provided by way of example and it should be understood that it may take other forms and include additional or fewer components without departing from the scope of the present disclosure. For instance, various components of the computing system(s) may be coupled for communication using a variety of communication protocols and/or technologies including, for instance, communication buses, software communication mechanisms, computer networks, etc. While not shown, the computing system 900 may include various operating systems, sensors, additional processors, and other physical configurations. Although, for purposes of clarity, FIG. 9 only shows a single processor 904, memory 906, communication unit 902, etc., it should be understood that the computing system 900 may include a plurality of one or more of these components.

The processor 904 may execute software instructions by performing various input, logical, and/or mathematical operations. The processor 904 may have various computing architectures to process data signals including, for example, a complex instruction set computer (CISC) architecture, a reduced instruction set computer (RISC) architecture, and/or an architecture implementing a combination of instruction sets. The processor 904 may be physical and/or virtual, and may include a single core or plurality of processing units and/or cores. In some implementations, the processor 904 may be capable of generating and providing electronic display signals to a display device, supporting the display of images, capturing and transmitting images, performing complex tasks including various types of feature extraction and sampling, etc. In some implementations, the processor 904 may be coupled to the memory 906 via the bus 910 to access data and instructions therefrom and store data therein. The bus 910 may couple the processor 904 to the other components of the computing system 900 including, for example, the memory 906, the communication unit 902, the input device 914, the output device 916, and the data store(s) 908.

The memory 906 may store and provide access to data to the other components of the computing system 900. The memory 906 may be included in a single computing device or a plurality of computing devices. In some implementations, the memory 906 may store instructions and/or data that may be executed by the processor 904. For example, the memory 906 may store a loading coordination engine 804 and its respective components, depending on the configuration. The memory 906 is also capable of storing other instructions and data, including, for example, an operating system, hardware drivers, other software applications, databases, etc. The memory 906 may be coupled to the bus 910 for communication with the processor 904 and the other components of computing system 900.

The memory 906 may include a non-transitory computer-usable (e.g., readable, writeable, etc.) medium, which can be any non-transitory apparatus or device that can contain, store, communicate, propagate or transport instructions, data, computer programs, software, code, routines, etc., for processing by or in connection with the processor 904. In some implementations, the memory 906 may include one or more of volatile memory and non-volatile memory (e.g., RAM, ROM, hard disk, optical disk, etc.). It should be understood that the memory 906 may be a single device or may include multiple types of devices and configurations.

The bus 910 can include a communication bus for transferring data between components of a computing system or between computing systems, a network bus system including a computer or portions thereof, a processor mesh, a combination thereof, etc. In some implementations, the various components operating on the computing system 900 (operating systems, device drivers, etc.) may cooperate and communicate via a communication mechanism included in or implemented in association with the bus 910. The software communication mechanism can include and/or facilitate, for example, inter-method communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit 902 may include one or more interface devices (I/F) for wired and wireless connectivity among the components of the system 800. For instance, the communication unit 902 may include various types known connectivity and interface options. The communication unit 902 may be coupled to the other components of the computing system 900 via the bus 910. The communication unit 902 may be electronically communicatively coupled to a network or other components of the system 800 (e.g., by wire, wirelessly, etc.). In some implementations, the communication unit 902 can link the processor 904 to a computer network, which may in turn be coupled to other processing systems. The communication unit 902 can provide other connections to other entities of the system 800 using various standard communication protocols.

The input device 914 may include any device for inputting information into the computing system 900. In some implementations, the input device 914 may include one or more peripheral devices. For example, the input device 914 may include a keyboard, a pointing device, microphone, an image/video capture device (e.g., camera), a touch-screen display integrated with the output device 916, etc.

The output device 916 may be any device capable of outputting information from the computing system 900. The output device 916 may include one or more of a display (LCD, OLED, etc.), a printer, a haptic device, audio reproduction device, touch-screen display, etc. In some implementations, the output device is a display which may display electronic images and data output by the computing system 900 for presentation to a user. In some implementations, the computing system 900 may include a graphics adapter (not shown) for rendering and outputting the images and data for presentation on output device 916. The graphics adapter (not shown) may be a separate processing device including a separate processor and memory (not shown) or may be integrated with the processor 904 and memory 906.

The data store(s) are information source(s) for storing and providing access to data, such as the database 820 and/or data described in reference to the database 820. The data stored by the data store(s) 908 may organized and queried using various criteria including any type of data stored by them, such as the data described in reference to the database 820 in FIG. 8. The data store(s) 908 may include file systems, data tables, documents, databases, or other organized collections of data.

The data store(s) 908 may be included in the computing system 900 or in another computing system and/or storage system distinct from but coupled to or accessible by the computing system 900. The data store(s) 908 can include one or more non-transitory computer-readable mediums for storing the data. In some implementations, the data store(s) 908 may be incorporated with the memory 906 or may be distinct therefrom. In some implementations, the data store(s) 908 may store data associated with a database management system (DBMS) operable on the computing system 900. For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations.

It should be noted that the components described herein may be further delineated or changed without departing from the techniques described herein. For example, the processes described throughout this disclosure may be performed by fewer, additional, or different components.

It should be understood that the methods described herein are provided by way of example, and that variations and combinations of these methods, as well as other methods, are contemplated. For example, in some implementations, at least a portion of one or more of the methods represent various segments of one or more larger methods and may be concatenated or various steps of these methods may be combined to produce other methods which are encompassed by the present disclosure. Additionally, it should be understood that various operations in the methods are iterative, and thus repeated as many times as necessary generate the results described herein. Further the ordering of the operations in the methods is provided by way of example and it should be understood that various operations may occur earlier and/or later in the method without departing from the scope thereof.

In the above description, for purposes of explanation, numerous specific details are set forth in order to provide a thorough understanding of the present disclosure. However, it should be understood that the technology described herein can be practiced without these specific details in various cases. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms such as "processing," "computing," "calculating," "determining," "displaying," or the like, refer to the action and methods of a computer system that manipulates and transforms data represented as physical (electronic) quantities within the computer system's registers and memories into other data similarly represented as physical quantities within the computer system memories or registers or other such information storage, transmission or display devices.

A data processing system suitable for storing and/or executing program code, such as the computing system and/or devices discussed herein, may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input or I/O devices can be coupled to the system either directly or through intervening I/O controllers. The data processing system may include an apparatus may be specially constructed for the required purposes, or it may comprise a general-purpose computer selectively activated or reconfigured by a computer program stored in the computer.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects may not be mandatory or significant, and the mechanisms that implement the specification or its features may have different names, divisions, and/or formats.

Furthermore, the modules, routines, features, attributes, methodologies and other aspects of the disclosure can be implemented as software, hardware, firmware, or any combination of the foregoing. The technology can also take the form of a computer program product accessible from a computer-usable or computer-readable medium providing program code for use by or in connection with a computer or any instruction execution system. Wherever a component, an example of which is a module or engine, of the specification is implemented as software, the component can be implemented as a standalone program, as part of a larger program, as a plurality of separate programs, as a statically or dynamically linked library, as a kernel loadable module, as firmware, as resident software, as microcode, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A method comprising:
   determining, by a loading coordination engine, a delivery destination of a first item based on item data associated with the first item;
   assigning, by the loading coordination engine, the first item to a location in a delivery vehicle;
   generating, by the loading coordination engine, a task list including an instruction to an automated guided vehicle ("AGV") to position the first item in the delivery vehicle based on the assigned location in the delivery vehicle;
   navigating the AGV to a loading area to retrieve the first item from the loading area;

navigating the AGV to a point proximate to the assigned location in the delivery vehicle;
placing, by the AGV, the first item at the assigned location based on the task list; and
positioning the AGV within the delivery vehicle in response to completion of packing the delivery vehicle.

2. The method of claim 1, wherein assigning the first item to the location in the delivery vehicle is based on the delivery destination determined for the first item.

3. The method of claim 2, wherein assigning the first item to the location in the delivery vehicle includes determining a position of the first item in a sequence of deliveries of a set of items assigned to the delivery vehicle.

4. The method of claim 1, wherein determining the delivery destination of the first item includes
capturing a label of the first item, and
determining, based on the captured label on to the first item, the delivery destination.

5. The method of claim 1, comprising:
assigning, by the loading coordination engine, the first item to a door dock associated with the delivery vehicle based on the delivery destination of the first item; and
instructing, by the loading coordination engine, a conveyor mechanism to transport the first item to the door dock associated with the delivery vehicle.

6. The method of claim 1, wherein assigning the first item to the location in the delivery vehicle includes
determining one or more measurements of the first item,
determining one or more measurements of available storage locations in the delivery vehicle,
determining a position of a delivery of the first item in a sequence of deliveries of a set of items assigned to the delivery vehicle, and
determining the assigned location of the first item based on the one or more measurements of the first item, the one or more measurements of the available storage locations in the delivery vehicle, and the position of the delivery of the first item in the sequence of deliveries.

7. The method of claim 1, wherein the delivery vehicle includes a stabilizing mechanism adapted to impede movement of the AGV within the delivery vehicle.

8. The method of claim 7, wherein the AGV includes a stabilizing mechanism interface interacting with the stabilizing mechanism of the delivery vehicle, the stabilizing mechanism interface and stabilizing mechanism stabilizing the AGV during acceleration of the delivery vehicle.

9. The method of claim 1, wherein the delivery vehicle includes a shelf at the assigned location, the shelf including a mechanism adapted to transport items between a first side of the shelf being proximate to the AGV and a second side of the shelf being distal from the AGV.

10. The method of claim 1, wherein the AGV includes a drive unit that provides motive force to the AGV, a guidance system that locates the AGV in the delivery vehicle, and an item handling mechanism adapted to move items.

11. A system comprising:
an automated guided vehicle ("AGV");
a delivery vehicle; and
a computing system including one or more processors and a memory storing instructions that, when executed by the one or more processors, cause the system to:
assign a first item to a location in the delivery vehicle;
generate a task list including an instruction to the AGV to position the first item in the delivery vehicle based on the assigned location in the delivery vehicle;
navigate the AGV to a loading area to retrieve the first item from the loading area;
navigate the AGV to a point proximate to the assigned location in the delivery vehicle;
instruct the AGV to place the first item at the assigned location based on the task list; and
automatically position the AGV within the delivery vehicle in response to completion of packing the delivery vehicle.

12. The system of claim 11, wherein assigning the first item to the location in the delivery vehicle is based on a delivery destination determined for the first item.

13. The system of claim 12, wherein assigning the first item to the location in the delivery vehicle includes determining a position of the first item in a sequence of deliveries of a set of items assigned to the delivery vehicle.

14. The system of claim 11, wherein the instructions, when executed by the one or more processors, further cause the system to
assign the first item to a door dock associated with the delivery vehicle based on a delivery destination of the first item, and
instruct, by the computing system, a conveyor mechanism to transport the first item to the door dock associated with the delivery vehicle.

15. The system of claim 11, wherein assigning the first item to the location in the delivery vehicle includes
determining one or more measurements of the first item,
determining one or more measurements of available storage locations in the delivery vehicle, and
determining the assigned location of the first item based on the one or more measurements of the first item and the one or more measurements of the available storage locations in the delivery vehicle.

16. The system of claim 11, wherein the delivery vehicle includes a stabilizing mechanism adapted to impede movement of the AGV within the delivery vehicle.

17. The system of claim 16, wherein the AGV includes a stabilizing mechanism interface interacting with the stabilizing mechanism of the delivery vehicle, the stabilizing mechanism interface and stabilizing mechanism stabilizing the AGV during acceleration of the delivery vehicle.

18. The system of claim 11, wherein the delivery vehicle includes a shelf at the assigned location, the shelf including a mechanism adapted to transport items between a first side of the shelf being proximate to the AGV and a second side of the shelf being distal from the AGV.

19. The system of claim 11, wherein the AGV includes a drive unit that provides motive force to the AGV, a guidance system that locates the AGV in the delivery vehicle, and an item handling mechanism adapted to move items.

20. An automated guided vehicle ("AGV") comprising:
a body;
a drive unit coupled with the body and providing motive force to the body;
a guidance system coupled with a controller, the guidance system locating the AGV in a delivery vehicle;
an item handling mechanism coupled with the body and the controller, the item handling mechanism adapted to move an item; and
the controller coupled with the drive unit, the guidance system, and the item handling mechanism, the controller performing operations including:
receiving a task list including an instruction to the AGV to position the item in the delivery vehicle based on an assigned location on a shelf in the delivery vehicle;

instructing the drive unit to navigate the AGV to a point proximate to the assigned location on the shelf in the delivery vehicle using the guidance system;

instructing the item handling mechanism to place the item at the assigned location based on the task list; and instructing the drive unit to position the AGV within the delivery vehicle in response to completion of packing the delivery vehicle.

* * * * *